US011948516B2

(12) United States Patent
Lee et al.

(10) Patent No.: US 11,948,516 B2
(45) Date of Patent: *Apr. 2, 2024

(54) DISPLAY DEVICE

(71) Applicant: SAMSUNG DISPLAY CO., LTD., Yongin-si (KR)

(72) Inventors: Jaemin Lee, Yongin-si (KR); Sooin You, Yongin-si (KR); Youngsun Jang, Yongin-si (KR); Hyunggi Jung, Yongin-si (KR); Soonchang Yeon, Yongin-si (KR); Hyungtae Jung, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/114,161

(22) Filed: Feb. 24, 2023

(65) Prior Publication Data

US 2023/0245624 A1 Aug. 3, 2023

Related U.S. Application Data

(63) Continuation of application No. 17/378,011, filed on Jul. 16, 2021, now Pat. No. 11,594,185.

(30) Foreign Application Priority Data

Dec. 17, 2020 (KR) ........................ 10-2020-0177819

(51) Int. Cl.
*G09G 3/3275* (2016.01)

(52) U.S. Cl.
CPC ... *G09G 3/3275* (2013.01); *G09G 2300/0842* (2013.01); *G09G 2310/0272* (2013.01)

(58) Field of Classification Search
CPC ......... G09G 3/3275; G09G 2300/0842; G09G 2310/0272
See application file for complete search history.

(56) References Cited

U.S. PATENT DOCUMENTS

| | | | |
|---|---|---|---|
| 8,188,472 | B2 | 5/2012 | Park et al. |
| 8,461,585 | B2 | 6/2013 | Choi et al. |

(Continued)

FOREIGN PATENT DOCUMENTS

| | | | |
|---|---|---|---|
| KR | 101148829 | B1 | 5/2012 |
| KR | 101774992 | B1 | 8/2017 |
| KR | 102138037 | B1 | 7/2020 |

*Primary Examiner* — Matthew A Eason
*Assistant Examiner* — Scott D Au
(74) *Attorney, Agent, or Firm* — CANTOR COLBURN LLP

(57) ABSTRACT

A display device includes a driving voltage line and a plurality of data lines extending in a first direction, a first driving transistor electrically connected to the driving voltage line, a first switching transistor electrically connected to the first driving transistor and including a first switching semiconductor layer extending in a second direction crossing the first direction and a first switching gate electrode overlapping a channel region of the first switching semiconductor layer, and a first storage capacitor electrically connected to the first driving transistor and the first switching transistor, where the first switching semiconductor layer is electrically connected to a first data line, the first switching semiconductor layer crosses a second data line between the channel region and the first data line, and a crossing region of an edge of the first switching semiconductor layer and an edge of the second data line overlaps a first protection layer.

22 Claims, 29 Drawing Sheets

(56) References Cited

U.S. PATENT DOCUMENTS

| | | | | |
|---|---|---|---|---|
| 10,615,196 | B2 | 4/2020 | Liu et al. | |
| 11,594,185 | B2 * | 2/2023 | Lee | G09G 3/3275 |
| 2020/0105793 | A1 | 4/2020 | Ding et al. | |
| 2021/0202612 | A1 * | 7/2021 | Jung | G09G 3/32 |

* cited by examiner

DISPLAY DEVICE

This application is a continuation of U.S. patent application Ser. No. 17/378,011, filed on Jul. 6, 2021, which claims priority to Korean Patent Application No. 10-2020-0177819, filed on Dec. 17, 2020, and all the benefits accruing therefrom under 35 U.S.C. § 119, the content of which in its entirety is herein incorporated by reference.

BACKGROUND

1. Field

One or more embodiments relate to a display device.

2. Description of the Related Art

As a field of displays that visually express various pieces of electric signal information rapidly develops, various display devices are introduced with excellent characteristics such as being thinner and more lightweight and having low power consumption.

Display devices may include liquid crystal display devices that do not spontaneously emit light and use light from a backlight unit, or light-emitting display devices including a display element that may emit light. The light-emitting display devices may include display elements including an emission layer.

SUMMARY

One or more embodiments include a display device, and more particularly, include a structure for a light-emitting display device.

Additional features will be set forth in part in the description which follows and, in part, will be apparent from the description, or may be learned by practice of the presented embodiments of the invention.

In an embodiment of the invention, a display device includes a driving voltage line extending in a first direction, a plurality of data lines extending in the first direction, a first driving transistor electrically connected to the driving voltage line, a first switching transistor electrically connected to the first driving transistor and including a first switching semiconductor layer extending in a second direction crossing the first direction, and a first switching gate electrode overlapping a channel region of the first switching semiconductor layer, and a first storage capacitor electrically connected to the first driving transistor and the first switching transistor, wherein the first switching semiconductor layer is electrically connected to a first data line of the plurality of data lines, the first switching semiconductor layer crosses a second data line arranged between the channel region and the first data line, and a crossing region of an edge of the first switching semiconductor layer and an edge of the second data line overlaps a first protection layer.

In an embodiment, the first protection layer may include a first sub-layer including an insulating material.

In an embodiment, the first protection layer may further include a second sub-layer on the first sub-layer and including a metal material.

In an embodiment, a material of at least one of the first switching gate electrode of the first switching transistor, a gate electrode of the first driving transistor, or a first capacitor electrode of the first storage capacitor is identical to the metal material of the second sub-layer.

In an embodiment, the display device may further include a second driving transistor electrically connected to the driving voltage line, and a second switching transistor electrically connected to the second driving transistor, where the second data line may be electrically connected to the second switching transistor.

In an embodiment, the first protection layer may have an isolated shape.

In an embodiment, the first driving transistor may include a first driving semiconductor layer, and a first driving gate electrode overlapping a channel region of the first driving semiconductor layer, where the first driving semiconductor layer may overlap and cross one of a plurality of electrodes of the first storage capacitor, and a crossing region between an edge of the first driving semiconductor layer and an edge of the one of the plurality of electrodes of the first storage capacitor may overlap a second protection layer.

In an embodiment, the second protection layer may include a first sub-layer including an insulating material, and a material of a gate insulating layer between the channel region of the first driving semiconductor layer and the first driving gate electrode is identical to the insulating material of the first sub-layer.

In an embodiment, the second protection layer may further include a second sub-layer on the first sub-layer.

In an embodiment, the fourth sub-layer may be unitary with the first driving gate electrode.

In an embodiment of the invention, a display device includes a driving voltage line extending in a first direction, a plurality of data lines extending in the first direction, a first driving transistor electrically connected to the driving voltage line and including a first driving semiconductor layer extending in a second direction crossing the first direction, and a first driving gate electrode overlapping a channel region of the first driving semiconductor layer, a first switching transistor electrically connected to the first driving transistor, and a first storage capacitor electrically connected to the first driving transistor and the first switching transistor, where the first driving semiconductor layer crosses at least one of the driving voltage line or an electrode of the first storage capacitor, and a crossing region between an edge of the first driving semiconductor layer and an edge of the at least one overlaps a protection layer.

In an embodiment, a portion of the first driving semiconductor layer may overlap and cross the driving voltage line, and the protection layer may include a first protection layer overlapping a crossing region between an edge of the driving voltage line and an edge of the portion of the first driving semiconductor layer.

In an embodiment, the first protection layer may have an isolated shape.

In an embodiment, the first protection layer may include a first sub-layer including an insulating material.

In an embodiment, the first protection layer may further include a second sub-layer arranged on the first sub-layer and including a same material as a material of one of a gate electrode of the first switching transistor, the first driving gate electrode of the first driving transistor, and a first capacitor electrode of the first storage capacitor.

In an embodiment, a portion of the first driving semiconductor layer may overlap and cross the electrode of the first storage capacitor, and the protection layer may include a second protection layer overlapping a crossing region between an edge of the portion of the first driving semiconductor layer and an edge of the electrode of the first storage capacitor.

In an embodiment, the second protection layer may include a first sub-layer including an insulating material, and a material of a gate insulating layer between the channel region of the first driving semiconductor layer and the first driving gate electrode is identical to the insulating material of the first sub-layer.

In an embodiment, the second protection layer may further include a second sub-layer on the first sub-layer.

In an embodiment, the second sub-layer may be unitary with the first driving gate electrode.

In an embodiment, the first switching transistor may include a first switching semiconductor layer extending in the second direction, the first switching semiconductor layer may be electrically connected to a first data line of the plurality of data lines, and may cross a second data line arranged between the channel region and the first data line, and a crossing region between an edge of the first switching semiconductor layer and an edge of the second data line may overlap a third protection layer.

In an embodiment, the third protection layer may have an isolated shape.

In an embodiment, the first switching transistor may include a first switching semiconductor layer extending in the second direction and electrically connected to a first data line of the plurality of data lines, and the first switching semiconductor layer may be connected to a connector that crosses a second data line arranged between the first data line and the first switching semiconductor layer.

In an embodiment of the invention, a display device includes a driving voltage line extending in a first direction, a plurality of data lines extending in the first direction, a first driving transistor electrically connected to the driving voltage line, a first switching transistor electrically connected to the first driving transistor and including a first switching semiconductor layer extending in a second direction that cross the first direction, and a first switching gate electrode overlapping a channel region of the first switching semiconductor layer, and a first storage capacitor electrically connected to the first driving transistor and the first switching transistor, where the first switching semiconductor layer is electrically connected to a first data line of the plurality of data lines, and is electrically connected to the first data line through a connector crossing a second data line arranged between the first data line and the first switching semiconductor layer.

These and/or other features will become apparent and more readily appreciated from the following description of the embodiments, the accompanying drawings, and claims.

BRIEF DESCRIPTION OF THE DRAWINGS

The above and other features, and advantages of certain embodiments of the invention will be more apparent from the following description taken in conjunction with the accompanying drawings, in which.

DETAILED DESCRIPTION

Figure 1A:
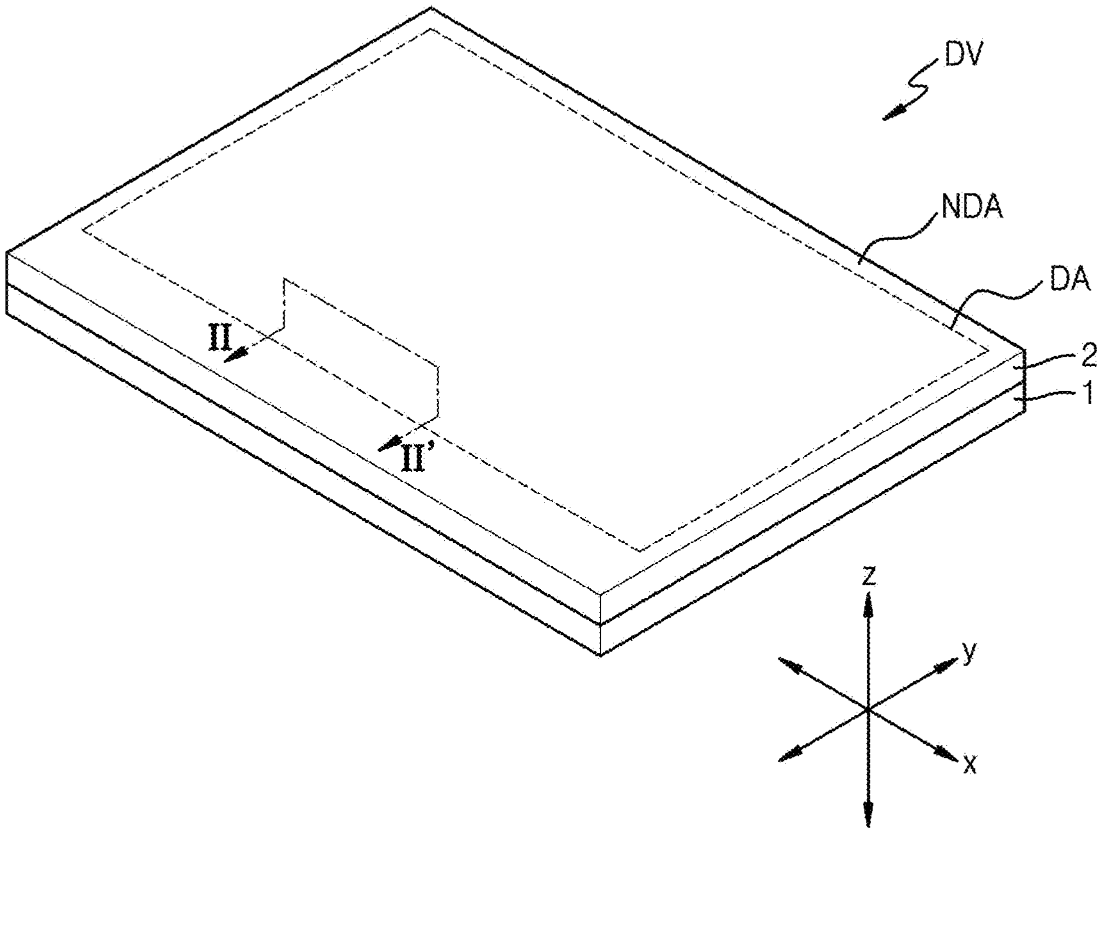
FIG. 1A is a perspective view of an embodiment of a display device.

Reference will now be made in detail to embodiments, examples of which are illustrated in the accompanying drawings, where like reference numerals refer to like elements throughout. In this regard, the embodiments may have different forms and should not be construed as being limited to the descriptions set forth herein. Accordingly, the embodiments are merely described below, by referring to the drawing figures, to explain features of the description. As used herein, the term "and/or" includes any and all combinations of one or more of the associated listed items. Throughout the disclosure, the expression "at least one of a, b or c" indicates only a, only b, only c, both a and b, both a and c, both b and c, all of a, b, and c, or variations thereof.

As the disclosure allows for various changes and numerous embodiments, certain embodiments will be illustrated in the drawings and described in the written description. Effects and features of the disclosure, and methods for achieving them will be clarified with reference to embodiments described below in detail with reference to the drawings. However, the disclosure is not limited to the following embodiments and may be embodied in various forms.

Hereinafter, embodiments will be described with reference to the accompanying drawings, where like reference numerals refer to like elements throughout and a repeated description thereof is omitted.

While such terms as "first" and "second" may be used to describe various components, such components must not be limited to the above terms. The above terms are used to distinguish one component from another.

The singular forms "a," "an," and "the" as used herein are intended to include the plural forms as well unless the context clearly indicates otherwise.

It will be understood that the terms "comprise," "comprising," "include" and/or "including" as used herein specify the presence of stated features or components but do not preclude the addition of one or more other features or components.

It will be further understood that, when a layer, region, or component is referred to as being "on" another layer, region, or component, it can be directly or indirectly on the other layer, region, or component. That is, for example, intervening layers, regions, or components may be present.

Sizes of elements in the drawings may be exaggerated or reduced for convenience of explanation. For example, since sizes and thicknesses of elements in the drawings are arbitrarily illustrated for convenience of explanation, the disclosure is not limited thereto.

When an embodiment may be implemented differently, a certain process order may be performed differently from the described order. For example, two consecutively described processes may be performed substantially at the same time or performed in an order opposite to the described order.

It will be understood that when a layer, region, or component is referred to as being "connected" to another layer, region, or component, it may be "directly connected" to the other layer, region, or component or may be "indirectly connected" to the other layer, region, or component with other layer, region, or component interposed therebetween. For example, it will be understood that when a layer, region, or component is referred to as being "electrically connected" to another layer, region, or component, it may be "directly electrically connected" to the other layer, region, or component or may be "indirectly electrically connected" to other layer, region, or component with other layer, region, or component interposed therebetween.

Figure 1B:
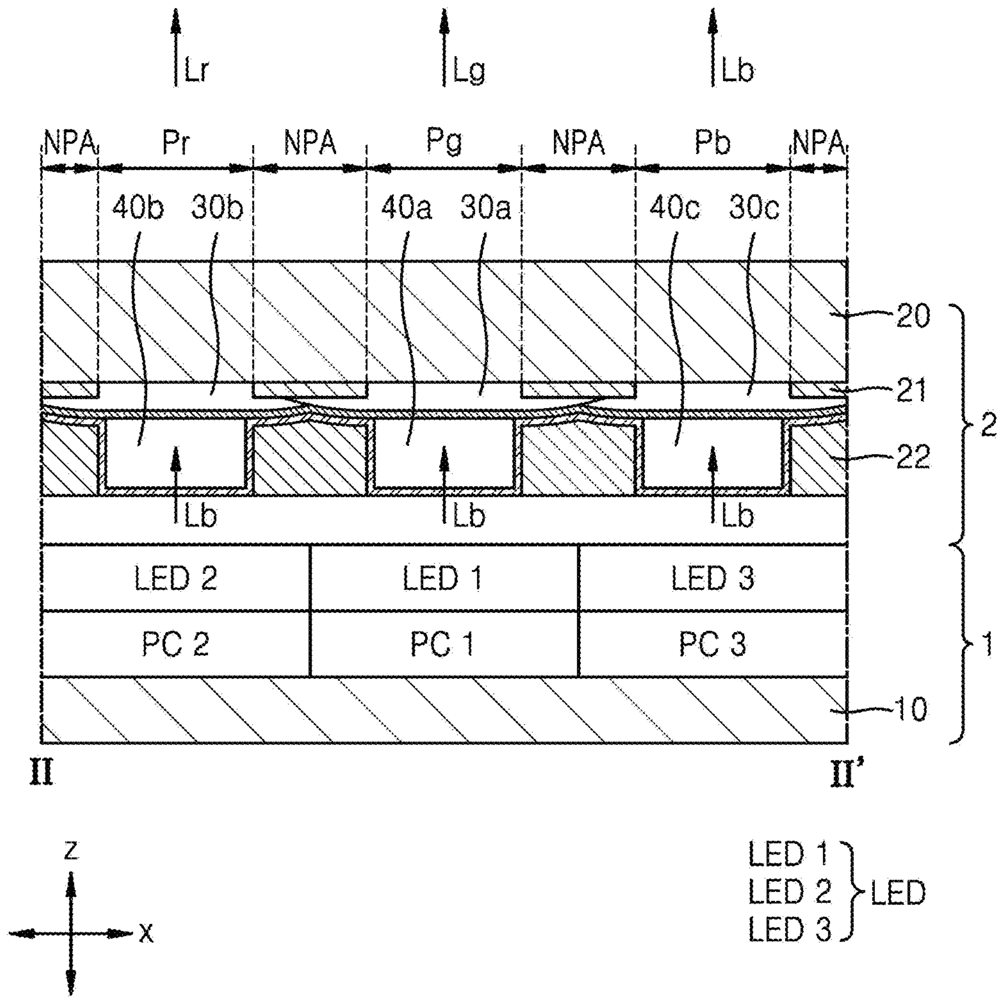
FIG. 1B is a cross-sectional view of an embodiment of a display device, taken along line II-II'.
Figure 1C:
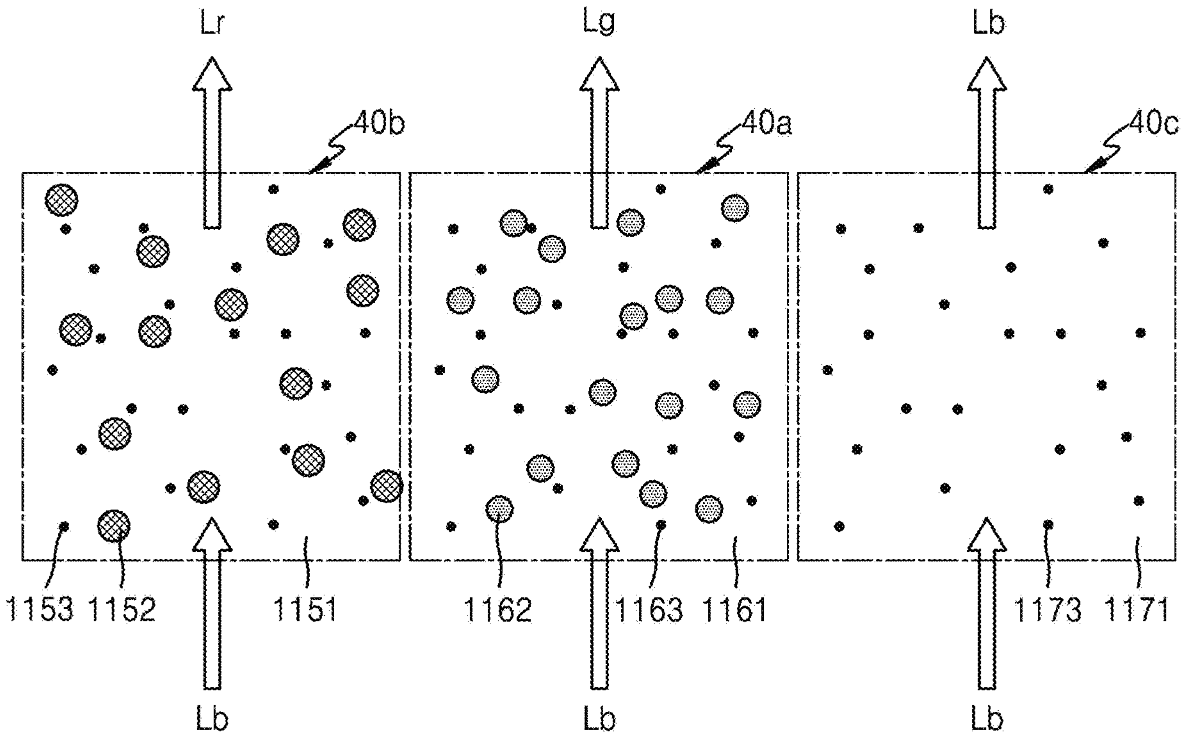
FIG. 1C is a view of each portion of a color conversion-transmission layer of FIG. 1B.

FIG. 1A is a perspective view of an embodiment of a display device DV, FIG. 1B is a cross-sectional view of an embodiment of the display device DV, taken along line and FIG. 1C is a view of an embodiment of each portion of a color conversion-transmission layer of FIG. 1B.

Referring to FIG. 1A, the display device DV may include a display area DA and a non-display area NDA outside the display area DA. The display device DV may display an image through an array of a plurality of pixels arranged in the display area DA two-dimensionally.

Each pixel of the display device is an area that may emit light having a preset color. The display device DV may display an image by light emitted from pixels. In an embodiment, each pixel may emit red, green, or blue light. However, the invention is not limited thereto, and each pixel may emit various other color light.

The non-display area NDA is an area that does not provide an image and may entirely surround the display area DA. A driver or a main power line may be arranged in the non-display area NDA, and the driver or the main power line may provide an electric signal or power to pixel circuits. The non-display area NDA may include a pad, which is an area to which an electronic element or a printed circuit board may be electrically connected.

The display area DA may have a polygonal shape including a quadrangle as shown in FIG. 1A. In an embodiment, the display area DA may have a rectangular shape in which a horizontal length is greater than a vertical length, a rectangular shape in which a horizontal length is less than a vertical length, or a square shape. In an alternative embodiment, the display area DA may have various shapes such as an elliptical shape or a circular shape.

In an embodiment, the display device DV may include a light emission panel 1 and a color panel 2 that are stacked in a thickness direction (e.g., a z-direction). Referring to FIG. 1B, the light emission panel 1 may include first to third pixel circuits PC1, PC2, and PC3 and first to third light-emitting diodes LED1, LED2, and LED3 respectively connected to the first to third pixel circuits PC1, PC2, and PC3 over a first substrate 10.

Light (e.g., blue light Lb) emitted from the first to third light-emitting diodes LED1, LED2, and LED3 may be converted to green light Lg, red light Lr, and blue light Lb while passing through the color panel 2, or may pass through the color panel 2 without conversion. An area from which green light Lg is emitted may correspond to a green pixel Pg, an area from which red light Lr is emitted may correspond to a red pixel Pr, and an area from which blue light Lb is emitted may correspond to a blue pixel Pb.

The color panel 2 may include a second substrate 20 and a first light-blocking layer 21 on the second substrate 20. A plurality of holes may be defined in the first light-blocking layer 21 while portions corresponding to the green pixel Pg, the red pixel Pr, and the blue pixel Pb are removed. The first light-blocking layer 21 may include a material portion arranged in a non-pixel area NPA. The material portion may include various materials that may absorb light.

A second light-blocking layer 22 may be arranged over the first light-blocking layer 21. The second light-blocking layer 22 may include a material portion arranged in the non-pixel area NPA. The second light-blocking layer 22 may include various materials that may absorb light. The second light-blocking layer 22 may include a material that is the same as or different from that of the first light-blocking layer 21.

The first light-blocking layer 21 and/or the second light-blocking layer 22 may include an opaque inorganic insulating material such as chrome oxide or molybdenum oxide, or an opaque organic insulating material such as a black resin.

A color layer may be arranged on the second substrate 20 and may include first to third color filters 30*a*, 30*b*, and 30*c*. The first color filter 30*a* may include pigment or dye of a first color (e.g., green). The second color filter 30*b* may include pigment or dye of a second color (e.g., red). The third color filter 30*c* may include pigment or dye of a third color (e.g., blue).

A color conversion-transmission layer may be arranged between the color layer and the light-emitting diodes, the color conversion-transmission layer including a first color-conversion portion 40*a*, a second color-conversion portion 40*b*, and a transmission portion 40*c*.

The first color-conversion portion 40*a* overlaps the first color filter 30*a* and may convert blue light Lb incident thereto to green light Lg. As shown in FIG. 1C, the first color-conversion portion 40*a* may include a first photosensitive polymer 1161, first quantum dots 1162, and first scattering particles 1163, the first quantum dots 1162 and the first scattering particles 1163 may be dispersed in the first photosensitive polymer 1161.

The first quantum dots 1162 may be excited by blue light Lb to emit green light Lg having a wavelength greater than the blue light isotropically. The first photosensitive polymer 1161 may be an organic material having light transmittance.

The first scattering particles 1163 scatter blue light Lb that is not absorbed by the first quantum dots 1162 to allow more first quantum dots 1162 to be excited, thereby increasing a color-conversion efficiency. The first scattering particles 1163 may be, for example, titanium oxide ($TiO_2$) or metal particles. The first quantum dots 1162 may be one of a group II-VI compound, a group III-V compound, a group IV-VI compound, a group IV element, a group IV compound, and any combinations thereof.

The second color-conversion portion 40*b* may overlap the second color filter 30*b* and convert blue light Lb incident thereto to red light Lr. As shown in FIG. 1C, the second color-conversion portion 40*b* may include a second photosensitive polymer 1151, second quantum dots 1152, and second scattering particles 1153, the second quantum dots 1152 and the second scattering particles 1153 may be dispersed in the second photosensitive polymer 1151.

The second quantum dots 1152 may be excited by blue light Lb to emit red light Lr having a wavelength greater than the blue light isotropically. The second photosensitive polymer 1151 may be an organic material having light transmittance. The second scattering particles 1153 scatter blue light Lb that is not absorbed by the second quantum dots 1152 to allow more second quantum dots 1152 to be excited, thereby increasing a color-conversion efficiency. In an embodiment, the second scattering particles 1153 may be, for example, titanium oxide ($TiO_2$) or metal particles, for example. The second quantum dots 1152 may be one of a group II-VI compound, a group III-V compound, a group IV-VI compound, a group IV element, and any combinations thereof. The second quantum dots 1152 may include the same material as that of the first quantum dots 1162. In this case, the size of the second quantum dots 1152 may be greater than the size of the first quantum dots 1162.

The transmission portion 40*c* may transmit the blue light Lb. As shown in FIG. 1C, the transmission portion 40*c* may include a third photosensitive polymer 1171 in which third scattering particles 1173 are dispersed. The third photosensitive polymer 1171 may include an organic material having a light transmittance such as a silicon resin and an epoxy resin and include the same material as those of the first and second photosensitive polymers 1151 and 1161. The third scattering particles 1173 may scatter the blue light Lb to emit the same and include the same material as those of the first and second scattering particles 1153 and 1163.

Blue light Lb emitted from the light emission panel 1 may be converted in its color while passing through the color conversion-transmission layer or may pass through the color conversion-transmission layer without color conversion, and then color purity may be improved while passing through the color layer. In an embodiment, blue light Lb emitted from the first light-emitting diode LED1 of the light emission panel 1 may pass through a first color area of the color panel 2. The blue light Lb may be converted and filtered into green light Lg by the color panel 2 while passing through the color panel 2. The first color area may have a stacking structure of the first color-conversion portion 40*a* and the first color filter 30*a*.

Blue light Lb emitted from the second light-emitting diode LED2 of the light emission panel 1 may pass through a second color area of the color panel 2. The blue light Lb may be converted and filtered into red light Lr by the color panel 2 while passing through the color panel 2. The second color area may have a stacking structure of the second color-conversion portion 40*b* and the second color filter 30*b*.

Blue light Lb emitted from the third light-emitting diode LED3 of the light emission panel 1 may pass through a third color area of the color panel 2. The blue light Lb may be transmitted and filtered by the color panel 2 while passing through the color panel 2. The third color area may have a stacking structure of the transmission portion 40*c* and the third color filter 30*c*.

The first to third light-emitting diodes LED1, LED2, and LED3 may each include an organic light-emitting diode including an organic material. In another embodiment, the first to third light-emitting diodes LED1, LED2, and LED3 may each include an inorganic light-emitting diode including an inorganic material. The inorganic light-emitting diode may include a PN-junction diode including inorganic semiconductor-based materials. When a voltage is applied to the PN-junction diode in a forward direction, a hole and an electron may be injected, and light having a preset color may be emitted by converting energy generated by recombination of the hole and the electron into light energy. The inorganic light-emitting diode may have a width of several micrometers to hundreds of micrometers or several nanometers to hundreds of nanometers. In an embodiment, the light-emitting diode LED may be a light-emitting diode including quantum dots. As described above, an emission layer of the light-emitting diode LED may include an organic material, an inorganic material, quantum dots, an organic material and quantum dots, or an inorganic material and quantum dots.

The display device having the above structure may include mobile phones, televisions, advertisement boards, monitors, tablet personal computers, and notebook computers.

Figure 2:
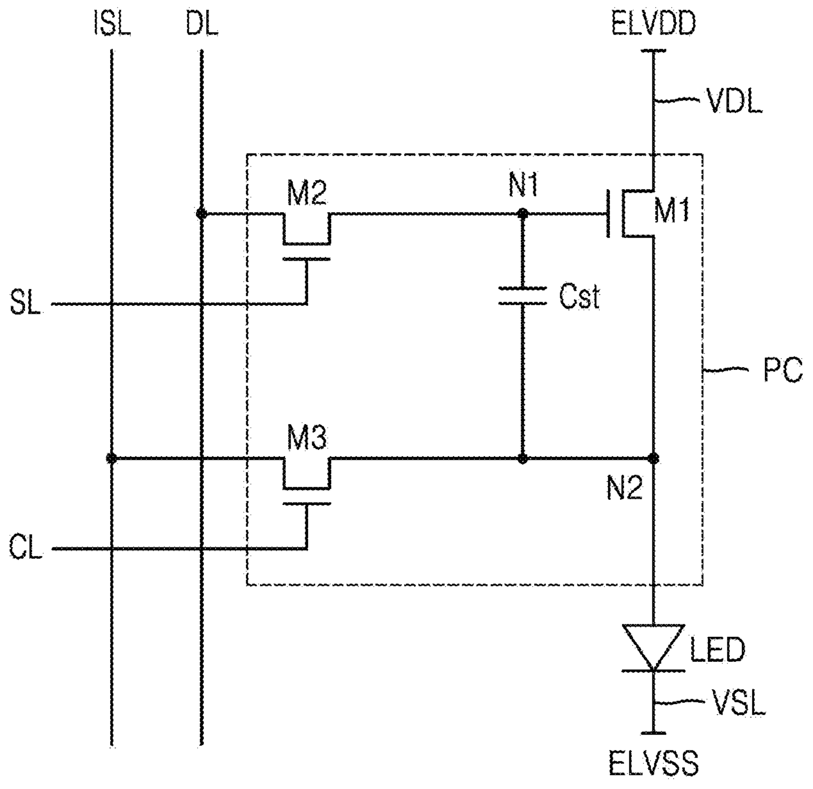
FIG. 2 is an equivalent circuit diagram of an embodiment of a light-emitting diode and a pixel circuit electrically connected to the light-emitting diode, included in a light emission panel of a display device.

FIG. 2 is an equivalent circuit diagram of an embodiment of a light-emitting diode and a pixel circuit electrically connected to the light-emitting diode, included in a light emission panel of a display device.

Referring to FIG. 2, a light-emitting diode, for example, a first electrode (e.g., an anode) of the light-emitting diode LED may be connected to a pixel circuit PC, and a second electrode (e.g., a cathode) of the light-emitting diode LED may be connected to a common voltage line VSL that provides a common power voltage ELVSS. The light-emitting diode LED may emit light at a brightness corresponding to the amount of current supplied from the pixel circuit PC.

The light-emitting diode LED of FIG. 2 may correspond to each of the first to third light-emitting diodes LED1, LED2, and LED3 shown above in FIG. 1B. The pixel circuit PC of FIG. 2 may correspond to each of the first to third pixel circuits PC1, PC2, and PC3 shown above in FIG. 1B.

The pixel circuit PC may control the amount of current flowing from a driving power voltage ELVDD to the common power voltage ELVSS through the light-emitting diode LED in response to a data signal. The pixel circuit PC may include a first transistor M1, a second transistor M2, a third transistor M3, and a storage capacitor Cst.

Each of the first transistor M1, the second transistor M2, and the third transistor M3 may be an oxide semiconductor thin-film transistor including a semiconductor layer including an oxide semiconductor, or a silicon semiconductor thin-film transistor including a semiconductor layer including polycrystalline silicon. A first electrode may be one of a source electrode and a drain electrode depending on the type of a transistor, and a second electrode may be the other of the source electrode and the drain electrode.

The first transistor M1 may be a driving transistor. A first electrode of the first transistor M1 may be connected to the driving voltage line VDL that supplies the driving power voltage ELVDD, and a second electrode may be connected to the first electrode of the light-emitting diode LED. A gate electrode of the first transistor M1 may be connected to a first node N1. The first transistor M1 may control the amount of current flowing from the driving power voltage ELVDD to the light-emitting diode LED in response to a voltage of the first node N1.

The second transistor M2 may be a switching transistor. A first electrode of the second transistor M2 may be connected to a data line DL, and a second electrode may be connected to the first node N1. A gate electrode of the second transistor M2 may be connected to a scan line SL. When a scan signal is supplied to the scan line SL, the second transistor M2 may be turned on to electrically connect the data line DL to the first node N1.

The third transistor M3 may be an initialization transistor and/or a sensing transistor. A first electrode of the third transistor M3 may be connected to a second node N2, and a second electrode may be connected to an initialization sensing line ISL. A gate electrode of the third transistor M3 may be connected to a control line CL.

When a control signal is supplied to the control line CL, the third transistor M3 may be turned on to electrically connect the initialization sensing line ISL to the second node N2. In an embodiment, the third transistor M3 may be turned on according to a signal transferred through the control line CL and may initialize the first electrode of the light-emitting diode LED by applying an initialization voltage from the initialization sensing line ISL to the first electrode of the light-emitting diode LED. In an embodiment, when a control signal is supplied to the control line CL, the third transistor T3 may be turned on to sense characteristic information of the light-emitting diode LED. The third transistor M3 may have both a function of the initialization transistor and a function of the sensing transistor or may have one of the functions. In an embodiment, in the case where the third transistor M3 has the function of the initialization transistor, the initialization sensing line ISL may be referred to as an initialization voltage line. In the case where the third transistor M3 has the function of the sensing transistor, the initialization sensing line ISL may be referred to as a sensing line. The initialization operation and the sensing operation of the third transistor M3 may be performed individually or simultaneously. Hereinafter, for convenience of description, the case where the third transistor M3 has both the function of the initialization transistor and the function of the sensing transistor is described.

The storage capacitor Cst may be connected between the first node N1 and the second node N2. In an embodiment, a first capacitor electrode of the storage capacitor Cst may be connected to the gate electrode of the first transistor M1, and a second capacitor electrode of the storage capacitor Cst may be connected to the first electrode of the light-emitting diode LED.

Though it is shown in FIG. 2 that the first transistor M1, the second transistor M2, and the third transistor M3 are n-channel metal oxide semiconductor ("NMOS"), the invention is not limited thereto. In an embodiment, at least one of the first transistor M1, the second transistor M2, or the third transistor M3 may be a p-channel metal oxide semiconductor ("PMOS"), for example.

Though FIG. 2 shows three transistors, the invention is not limited thereto. The pixel circuit PC may include four or more transistors.

Figure 3A:
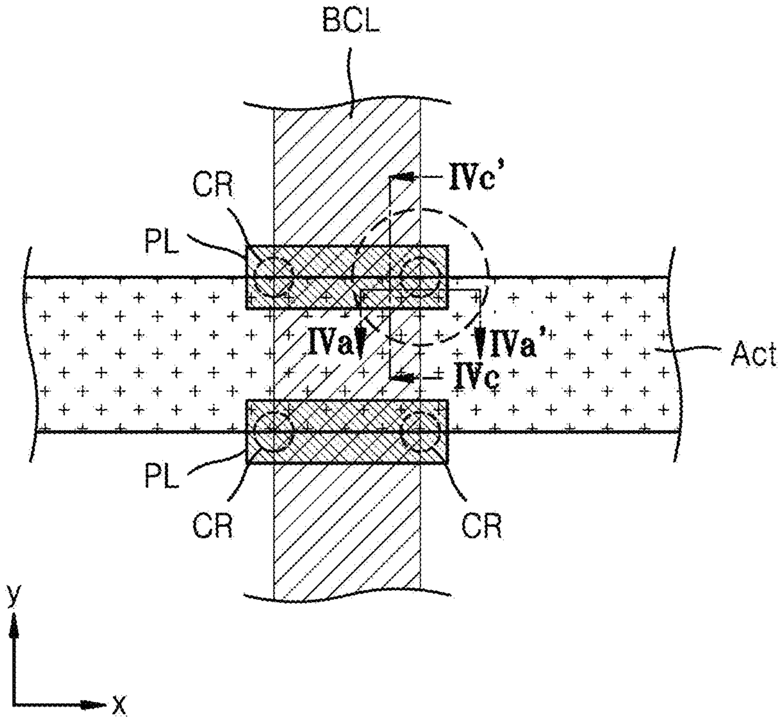
FIG. 3A is a plan view of an embodiment of a portion of a pixel circuit.
Figure 3B:
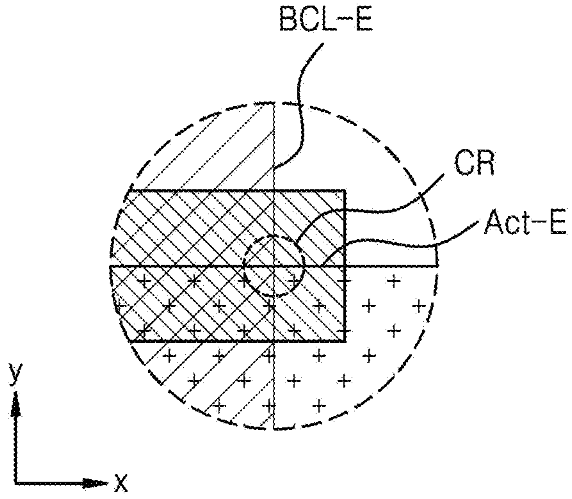
FIG. 3B is an enlarged view a portion of FIG. 3A.
Figure 4A:
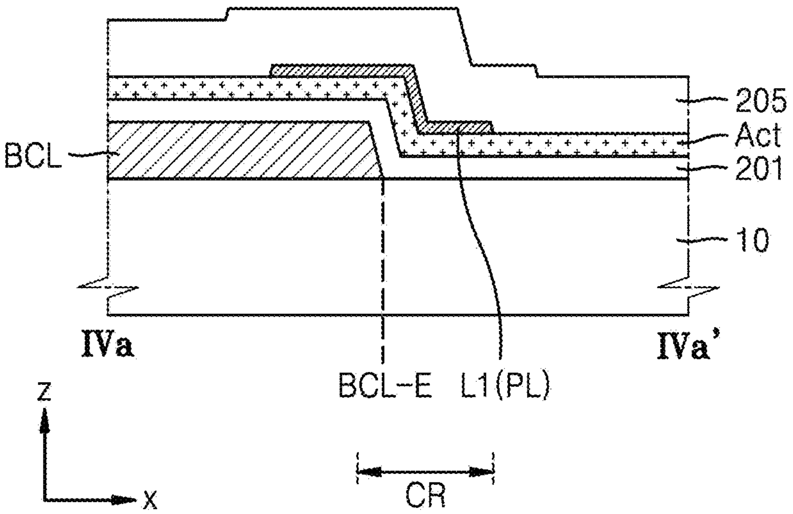
FIGS. 4A and 4B are cross-sectional views of an embodiment of an embodiment of the pixel circuit taken along line Iva-Iva' of FIG. 3A.
Figure 4B:
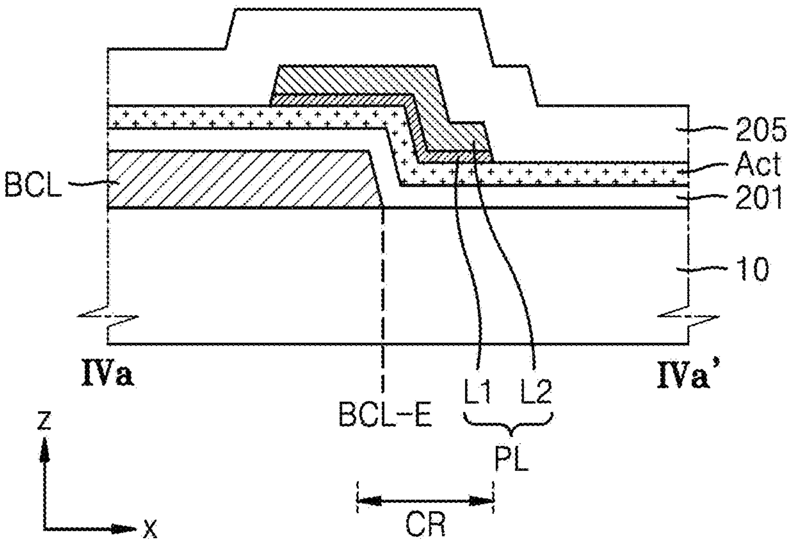
Figure 4C:
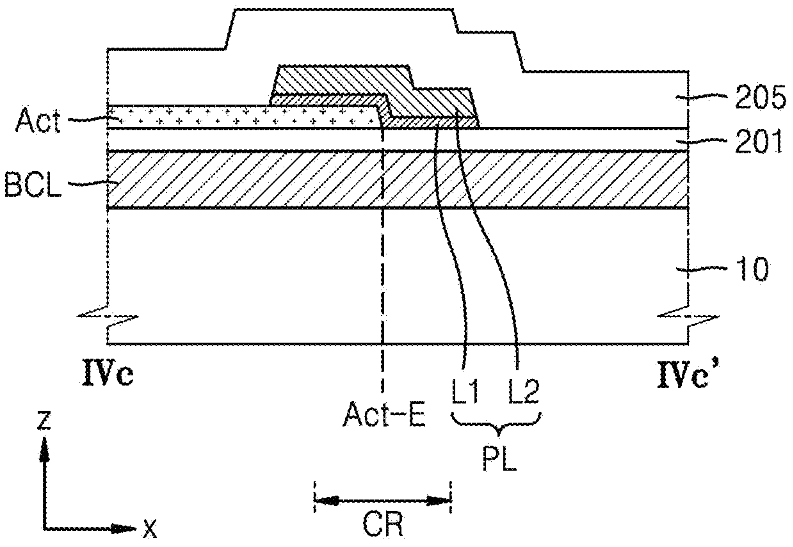
FIG. 4C is a cross-sectional view of an embodiment of the pixel circuit taken along line IVc-IVc' of FIG. 3A.
Figure 5:
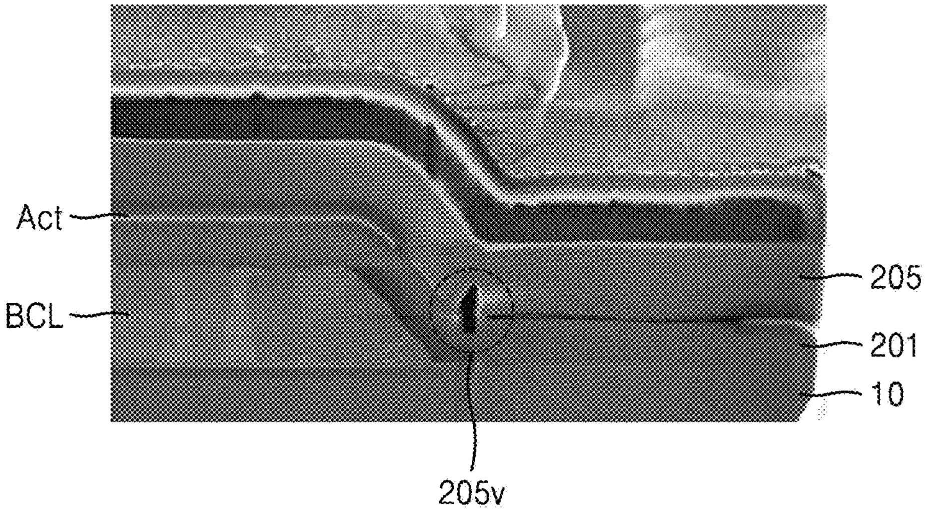
FIG. 5 is a cross-sectional view of a comparative example of a semiconductor layer and a bottom conductive layer in which a protection layer is not provided.

FIG. 3A is a plan view of a portion of a pixel circuit in an embodiment and shows a semiconductor layer Act, a bottom conductive layer BCL, and a protection layer, and FIG. 3B is an enlarged view a portion of FIG. 3A. FIGS. 4A and 4B are cross-sectional views of an embodiment of the pixel circuit taken along line Iva-Iva' of FIG. 3A. FIG. 4C is a cross-sectional view of an embodiment of the pixel circuit taken along line IVc-IVc' of FIG. 3A. FIG. 5 is a cross-sectional view of a comparative example of the semiconductor layer Act and the bottom conductive layer BCL in which a protection layer is not provided.

Referring to FIGS. 3A and 3B, a semiconductor layer Act may cross a bottom conductive layer BCL therebelow. In an embodiment, the semiconductor layer Act may extend in the x-direction, and the bottom conductive layer BCL may extend in the y-direction crossing the x-direction. The semiconductor layer Act may be a semiconductor layer of at least one of the transistors included in the pixel circuit described with reference to FIGS. 3A and 3B, and the bottom conductive layer BCL may be an element different from the transistor including the semiconductor layer Act, for example, a wiring or an electrode connected to another transistor, or an electrode of the storage capacitor.

The semiconductor layer Act may include an oxide-based material or a silicon-based material (e.g., amorphous silicon, polycrystalline silicon). In an embodiment, the semiconductor layer Act may include an oxide of at least one of indium (In), gallium (Ga), stannum (Sn), zirconium (Zr), vanadium (V), hafnium (Hf), cadmium (Cd), germanium (Ge), chromium (Cr), titanium (Ti), or zinc (Zn), for example. The semiconductor layer Act may include a channel region and low-resistance regions respectively arranged on two opposite sides with the channel region therebetween. The low-resistance region is a region having a resistance lower than that of the channel region and may correspond to a source region or a drain region.

The bottom conductive layer BCL may include a conductive material. In an embodiment, the bottom conductive layer BCL may include at least one of molybdenum (Mo), copper (Cu), or titanium (Ti) and have a single-layered structure or a multi-layered structure including the above materials, for example.

A protection layer PL may overlap a crossing region CR in which an edge Act-E of the semiconductor layer Act crosses an edge BCL-E of the bottom conductive layer BCL. As shown in FIG. 4A, the protection layer PL may include a first sub-layer L1. As shown in FIGS. 4B and 4C, the protection layer PL may include the first sub-layer L1 and a second sub-layer L2 on the first sub-layer L1. The first sub-layer L1 may include an insulating material such as an inorganic insulating material. The second sub-layer L2 may include a conductive material such as metal.

Referring to FIGS. 4A to 4C, the bottom conductive layer BCL may be disposed on the first substrate 10. The semiconductor layer Act may be arranged over the bottom conductive layer BCL. The semiconductor layer Act may be arranged over the bottom conductive layer BCL with a buffer layer 201 therebetween. The buffer layer 201 may include an inorganic insulating material such as silicon nitride, silicon oxide, and/or silicon oxynitride. In an embodiment, the semiconductor layer Act may include a silicon-based semiconductor such as polycrystalline silicon or an oxide-based semiconductor such as indium gallium zinc oxide ("IGZO").

The protection layer PL may overlap the crossing region CR of the edge of the semiconductor layer Act and the edge of the bottom conductive layer BCL, and may cover the crossing region CR. The protection layer PL may directly contact the top surface of the semiconductor layer Act as shown in FIGS. 4A to 4C. As shown in the enlarged view of FIG. 3B, an edge Act-E of the semiconductor layer Act crosses an edge BCL-E of the bottom conductive layer BCL. The protection layer PL may extend toward the outside in the y-direction farther than the edge Act-E of the semiconductor layer Act, and simultaneously, extend toward the outside in the x-direction farther than the edge BCL-E of the bottom conductive layer BCL. With regard to this, it is shown in FIGS. 4A to 4C that the protection layer PL covers a step difference between the semiconductor layer Act and the bottom conductive layer BCL in the crossing region CR, extends toward the outside farther than the edge BCL-E of the bottom conductive layer BCL (refer to FIGS. 4A and 4B), and extends toward the outside farther than the edge Act-E of the semiconductor layer Act (refer to FIG. 4C).

An inter-insulating layer 205 may be arranged on the semiconductor layer Act. In an embodiment, the inter-insulating layer 205 may be arranged on the protection layer PL. The inter-insulating layer 205 may include an inorganic insulating material such as silicon nitride, silicon oxide, and/or silicon oxynitride.

As a comparative example, as shown in FIG. 5, in the case where the protection layer PL is not provided, the inter-insulating layer 205 may include a cavity 205*v* arranged in the crossing region CR. A portion of the inter-insulating layer 205 where the cavity 205*v* is provided is thin and vulnerable structurally. The cavity 205*v* may be provided due to a step difference between the semiconductor layer Act and the bottom conductive layer BCL and/or stress of the inter-insulating layer 205 itself. The inter-insulating layer 205 may protect layers and a structure thereunder during a process of etching layers disposed on the inter-insulating layer 205. However, in the case where the inter-insulating layer 205 includes the cavity 205*v*, etchant used during the etching process may damage the semiconductor layer Act. In an embodiment, the etchant may progress to the semiconductor layer Act through a portion in which the cavity 205*v* is provided and damage the semiconductor layer Act. An operation characteristic of a transistor having the damaged semiconductor layer Act may be deteriorated, and a white spot of progression and/or dark spot may be caused to the display area DA (refer to FIG. 1A). In contrast, in an embodiment, the above issue may be prevented by arranging the protection layer PL which corresponds to a kind of etch stopper in the crossing region CR as shown in FIGS. 3A to 4B.

Figure 6A:
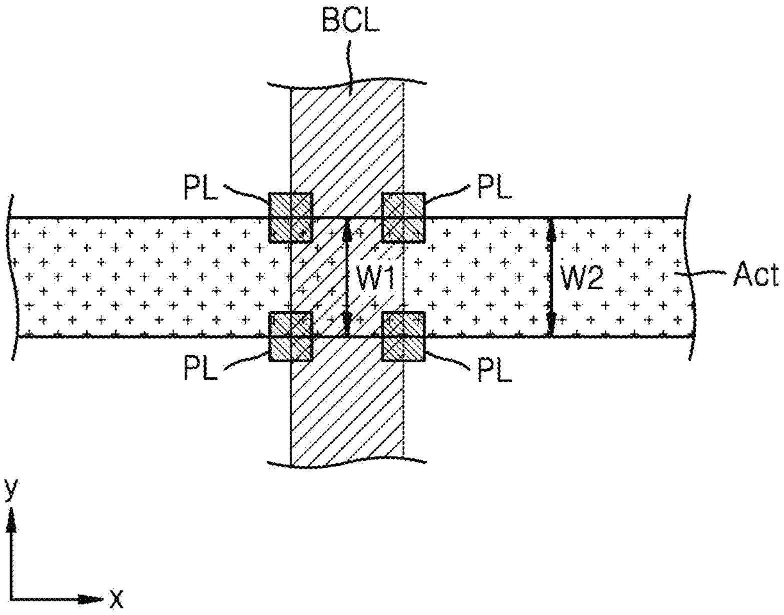
FIGS. 6A to 6C are plan views of another embodiment of a portion of a pixel circuit including a semiconductor layer, a bottom conductive layer, and a protection layer.
Figure 6B:
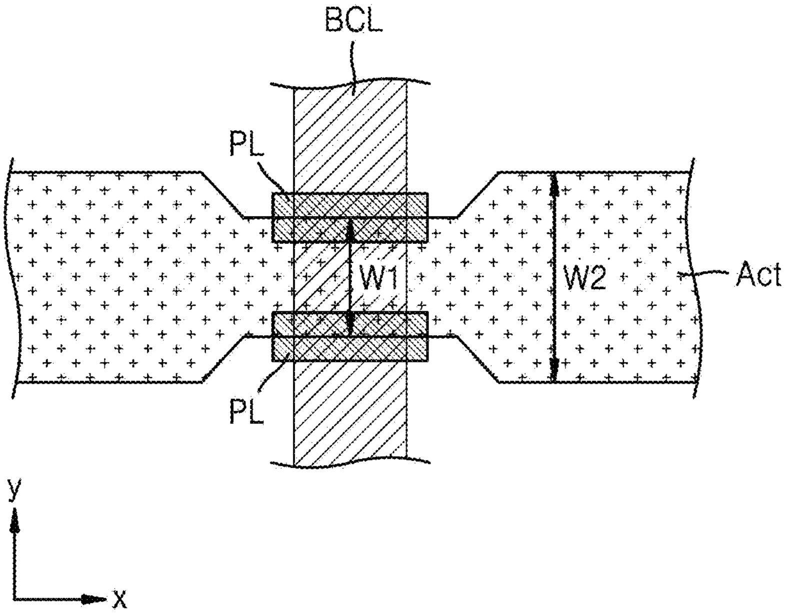
Figure 6C:
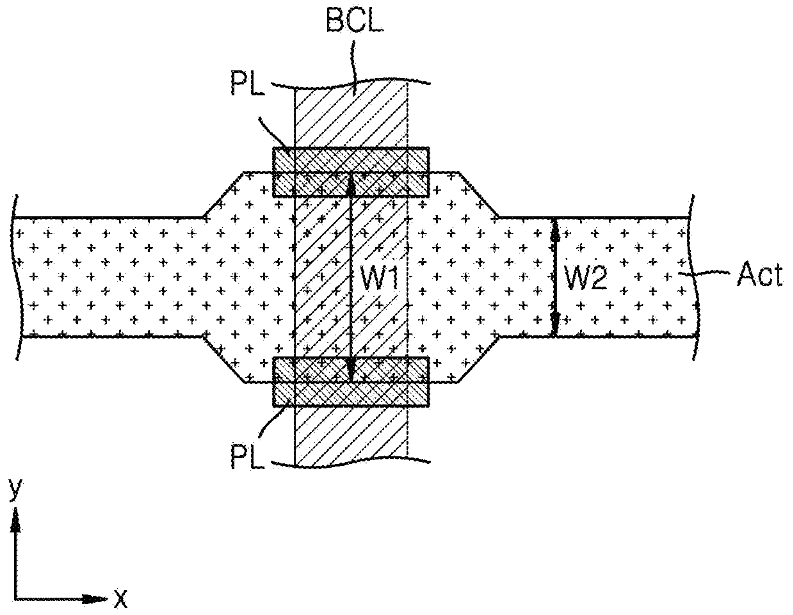

FIGS. 6A to 6C are plan views of another embodiment of a portion of a pixel circuit including a semiconductor layer, a bottom conductive layer, and a protection layer.

In the embodiment shown above with reference to FIG. 3A, it is shown that two protection layers PL overlap four crossing regions CR in a plan view. In an embodiment, one protection layer PL may overlap and/or cover two crossing regions CR neighboring in the x-direction, and the other protection layer PL may overlap and/or cover the other two crossing regions CR. In another embodiment, referring to FIG. 6A, one protection layer PL may overlap and/or cover the four crossing regions CR.

In an embodiment shown with reference to FIGS. 3A, 3B and 6A, though it is shown that a first width W1 of a first portion of the semiconductor layer Act that overlaps the bottom conductive layer BCL is substantially the same as a second width W2 of a second portion of the semiconductor layer Act that overlaps the bottom conducive layer BCL in a plan view, the invention is not limited thereto. In another embodiment, as shown in FIG. 6B, the first width W1 of the first portion of the semiconductor layer Act that overlaps the bottom conductive layer BCL may be less than the second width W2 of the second portion of the semiconductor layer Act that overlaps the bottom conducive layer BCL in a plan view. In an alternative embodiment, as shown in FIG. 6C, the first width W1 of the first portion of the semiconductor layer Act that overlaps the bottom conductive layer BCL may be greater than the second width W2 of the second portion of the semiconductor layer Act that overlaps the bottom conducive layer BCL in a plan view.

Figure 7:
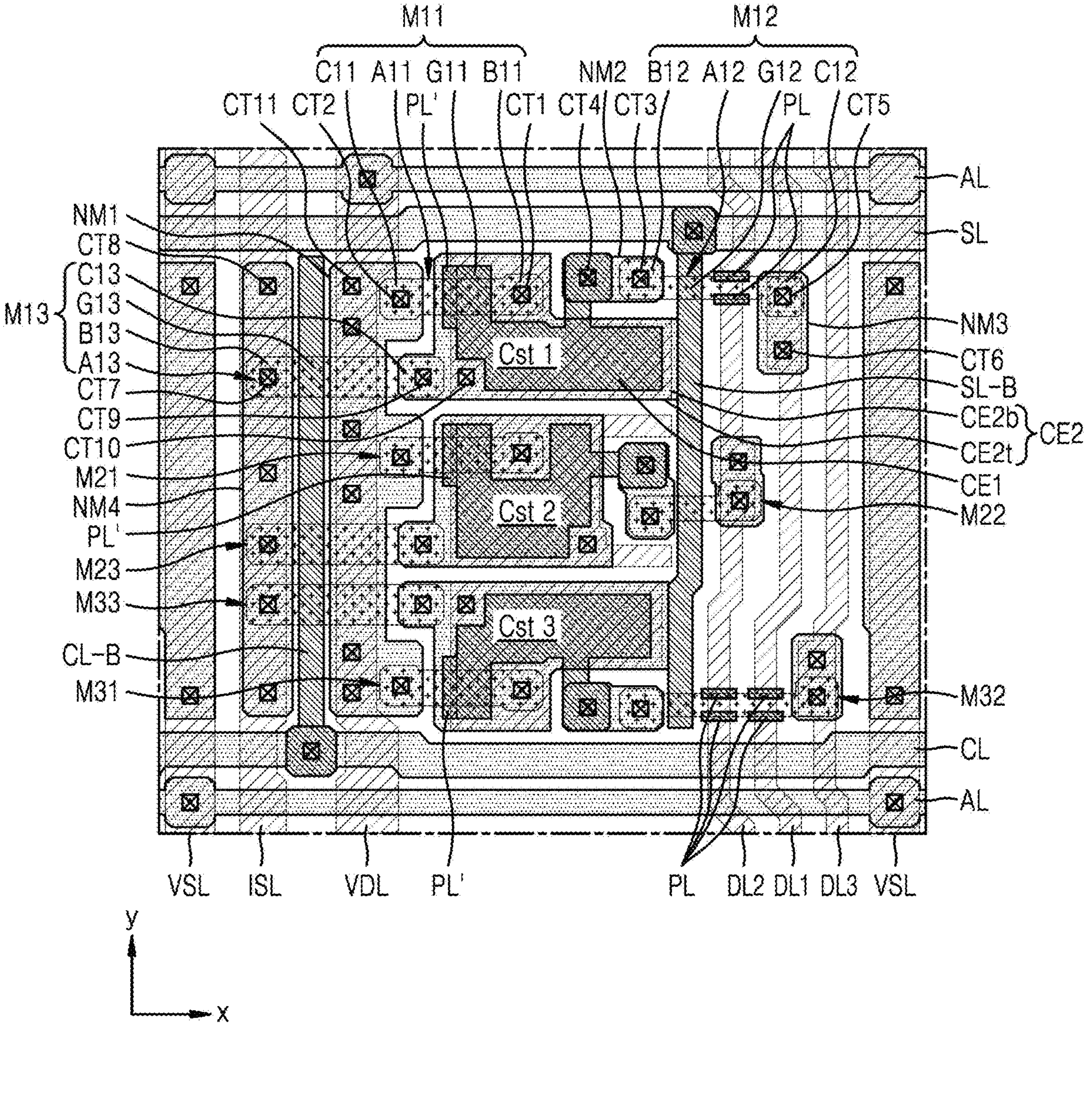
FIG. 7 is a plan view of an embodiment of pixel circuits of a light-emission panel.
Figure 8:
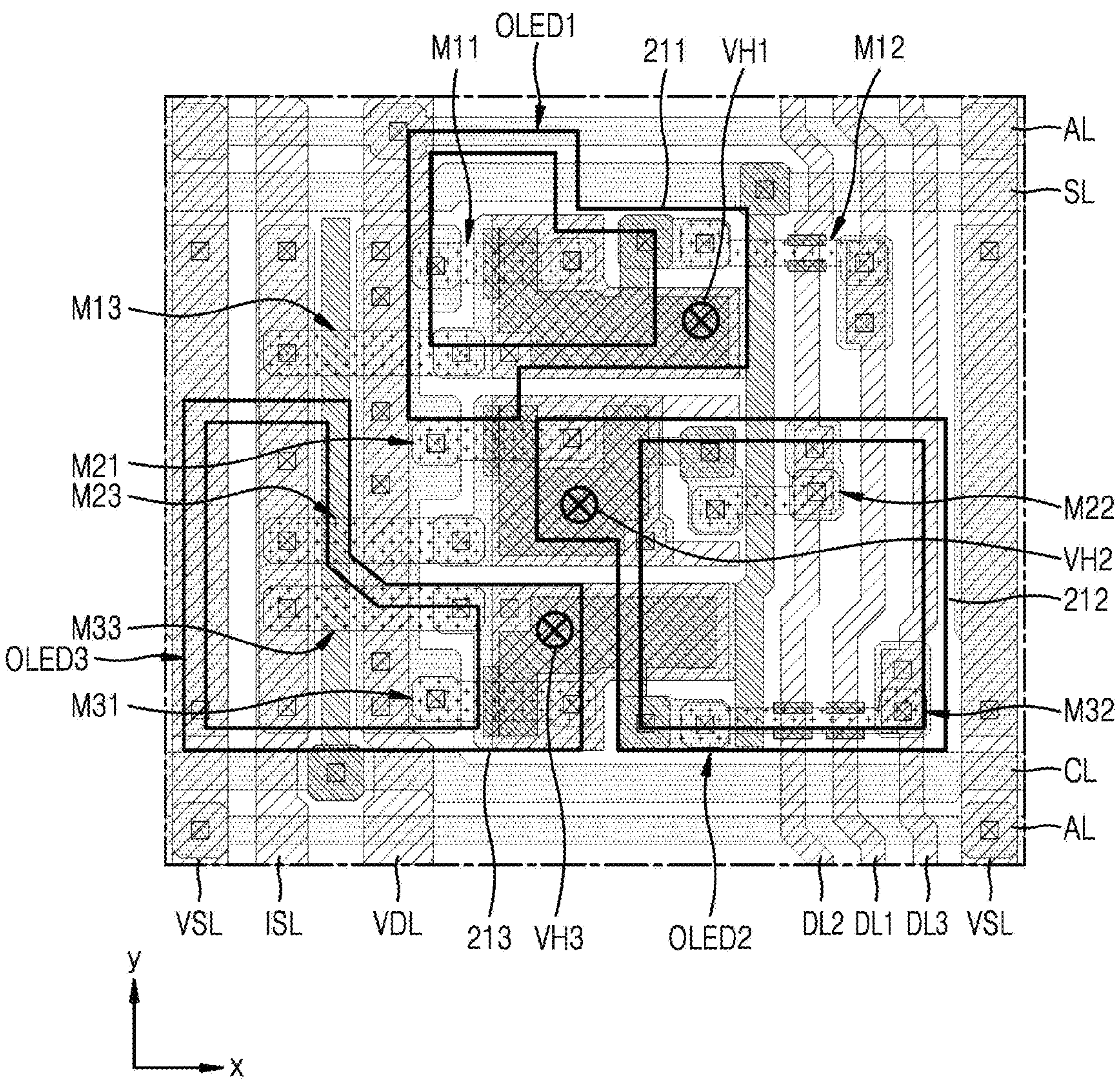
FIG. 8 is a plan view of an embodiment of light-emitting diodes connected to the pixel circuits of FIG. 7.

FIG. 7 is a plan view of an embodiment of pixel circuits of a light-emission panel, and FIG. 8 is a plan view of an embodiment of light-emitting diodes connected to the pixel circuits of FIG. 7. In an embodiment, FIG. 8 describes the case where a light-emitting diode is an organic light-emitting diode.

Referring to FIG. 7, the scan line SL and the control line CL may extend in the x-direction. A plurality of data lines, for example, first to third data lines DL1, DL2, and DL3 may be arranged in the x-direction crossing the y-direction and extend in the y-direction. The initialization sensing line ISL, the driving voltage line VDL, and the common voltage line VSL may extend in the y-direction.

In an embodiment, two adjacent common voltage lines VSL may be apart from each other. The first to third data lines DL1, DL2, and DL3, the initialization sensing line ISL, and the driving voltage line VDL may be arranged between the two adjacent common voltage lines VSL. The initialization sensing line ISL and the driving voltage line VDL are adjacent to each other and may be adjacent to one of the common voltage lines VSL. The first to third data lines DL1, DL2, and DL3 are adjacent to each other and may be adjacent to another common voltage line VSL. In an embodiment, the initialization sensing line ISL and the driving voltage line VDL may be arranged on one side (e.g., the left side) of first to third storage capacitors Cst1, Cst2, and Cst3 described below, and the first to third data lines DL1, DL2, and DL3 may be arranged on the other side (e.g., the right side). Through this structure, a space of the display panel may be efficiently used.

Auxiliary lines AL may extend, for example, in the x-direction such that the auxiliary lines AL cross the common voltage line VSL and the driving voltage line VDL. The auxiliary lines AL may be apart from each other with the first to third storage capacitors Cst1, Cst2, and Cst3 therebetween. In an embodiment, one of the auxiliary lines AL may be adjacent to the scan line SL, and another auxiliary line AL may be adjacent to the control line CL. One of the auxiliary lines AL may be electrically connected to the common voltage line VSL, and another auxiliary lines AL may be electrically connected to the driving voltage line VDL. The display panel may include a structure in which a structure shown in FIG. 7 is repeated in the x-direction and the y-direction. Accordingly, the plurality of auxiliary lines AL and the plurality of common voltage lines VSL provided to the display panel may constitute a mesh structure in a plan view. Likewise, the plurality of auxiliary lines AL and the plurality of driving voltage lines VDL electrically connected may constitute a mesh structure in a plan view.

In a plan view, transistors and storage capacitors may be arranged in an approximately quadrangular space surrounded by the neighboring common voltage lines VSL and the neighboring auxiliary lines AL. The transistors and the storage capacitors may be electrically connected to relevant light-emitting diodes, respectively. With regard to this, it is shown in FIG. 8 that first electrodes 211, 212, and 213 of first to third organic light-emitting diodes OLED1, OLED2, and OLED3 are electrically connected to relevant pixel circuits, respectively.

The first electrode 211 of the first organic light-emitting diode OLED1 may be electrically connected to a first pixel circuit. The first pixel circuit may include a first driving transistor M11, a first switching transistor M12, a first initialization-sensing transistor M13, and a first storage capacitor Cst1.

The second electrode 212 of the second organic light-emitting diode OLED2 may be electrically connected to a second pixel circuit. The second pixel circuit may include a second driving transistor M21, a second switching transistor M22, a second initialization-sensing transistor M23, and a second storage capacitor Cst2.

The third electrode 213 of the third organic light-emitting diode OLED3 may be electrically connected to a third pixel circuit. The third pixel circuit may include a third driving transistor M31, a third switching transistor M32, a third initialization-sensing transistor M33, and a third storage capacitor Cst3.

The first to third storage capacitors Cst1, Cst2, and Cst3 may be arranged in one direction, for example, the y-direction. The first storage capacitor Cst1 may be arranged relatively closest to the scan line SL, and the third storage capacitor Cst3 may be arranged relatively farthest from the scan line SL (or closest to the control line CL). The second storage capacitor Cst2 may be arranged between the first storage capacitor Cst1 and the third storage capacitor Cst3.

The first driving transistor M11 may include a first driving semiconductor layer A11 and a first driving gate electrode G11. The first driving semiconductor layer A11 may include a first low-resistance region B11 and a second low-resistance region C11. A first channel region may be arranged between the first low-resistance region B11 and the second low-resistance region C11. The first low-resistance region B11 and the second low-resistance region C11 are regions having a resistance lower than that of the first channel region and may be provided through a process of doping impurities or a process of making a conductor. The first driving gate electrode G11 may overlap the first channel region of the first driving semiconductor layer A11. One of the first low-resistance region B11 and the second low-resistance region C11 may correspond to a source region, and the other may correspond to a drain region.

One of the first low-resistance region B11 and the second low-resistance region C11 of the first driving semiconductor layer A11 may be connected to the first storage capacitor Cst1, and the other may be connected to the driving voltage line VDL. In an embodiment, the first low-resistance region B11 may be connected to a portion (e.g., a second sub-electrode CE2*t* of the second capacitor electrode) of a second capacitor electrode CE2 of the first storage capacitor Cst1 through a first contact hole CT1. The second low-resistance region C11 may be connected to a first connector NM1 through a second contact hole CT2. The first connector NM1 may be connected to the driving voltage line VDL through an eleventh contact hole CT11. The second low-resistance region C11 may be connected to the driving voltage line VDL through the first connector NM1.

The first switching transistor M12 may include a first switching semiconductor layer A12 and a first switching gate electrode G12. The first switching semiconductor layer A12 may include a first low-resistance region B12 and a second low-resistance region C12. A second channel region may be arranged between the first low-resistance region B12 and the second low-resistance region C12. The first switching gate electrode G12 may overlap a second channel region of the first switching semiconductor layer A12. The first switching gate electrode G12 may correspond to a portion of the scan line SL, for example, a portion of a branch SL-B (also referred to as a first branch, hereinafter) extending in a direction crossing the scan line SL.

The scan line SL may include gate electrodes of the first to third switching transistors M12, M22, and M32. In an embodiment, the scan line SL may include the first branch SL-B extending in the y-direction. Portions of the first branch SL-B may correspond to the first to third switching transistors M12, M22, and M32. The first branch SL-B may extend between the first to third storage capacitors Cst1, Cst2, and Cst3, and the first to third data lines DL1, DL2, and DL3.

One of a first low-resistance region B12 and a second low-resistance region C12 of the first switching semiconductor layer A12 may be electrically connected to the first data line DL1, and the other may be electrically connected to the first storage capacitor Cst1. In an embodiment, the first low-resistance region B12 may be connected to a second connector NM2 through a third contact hole CT3. The second connector NM2 may be connected to a first capacitor electrode CE1 of the first storage capacitor Cst1 through a fourth contact hole CT4. Accordingly, the first low-resistance region B12 may be connected to the first capacitor electrode CE1 of the first storage capacitor Cst1 by the first connector NM1. The second low-resistance region C12 may be connected to a third connector NM3 through a fifth contact hole CT5. The third connector NM3 may be connected to the first data line DL1 through a sixth contact hole CT6. The second low-resistance region C12 may be connected to the first data line DL1 by the third connector NM3.

The first initialization-sensing transistor M13 may include a first initialization-sensing semiconductor layer A13 and a first initialization-sensing gate electrode G13. The first initialization-sensing semiconductor layer A13 may include a first low-resistance region B13 and a second low-resistance region C13. The first initialization-sensing gate electrode G13 may overlap the first initialization-sensing semiconductor layer A13.

The control line CL may include gate electrodes of the first to third initialization-sensing transistors M13, M23, and M33. In an embodiment, the control line CL may include a branch CL-B (also referred to as a second branch, hereinafter) extending in the y-direction. Portions of the second branch CL-B may correspond to the gate electrodes of the first to third initialization-sensing transistors M13, M23, and M33. The second branch CL-B may extend between the driving voltage line VDL and the initialization sensing line ISL.

One of a first low-resistance region B13 and a second low-resistance region C13 of the first initialization-sensing semiconductor layer A13 may be electrically connected to the initialization sensing line ISL, and the other may be electrically connected to the first storage capacitor Cst1. In an embodiment, the first low-resistance region B13 may be connected to a fourth connector NM4 through a seventh contact hole CT7. The fourth connector NM4 may be connected to the initialization sensing line ISL through an eighth contact hole CT8. Accordingly, the first low-resistance region B13 may be electrically connected to the initialization sensing line ISL by the fourth connector NM4. The second low-resistance region C13 may be electrically connected to a portion of the second capacitor electrode CE2 of the first storage capacitor Cst1, for example, the second sub-electrode CE2*t* of the second capacitor electrode CE2 through a ninth contact hole CT9.

The first storage capacitor Cst1 may include at least two electrodes. In an embodiment, the first storage capacitor Cst1 may include the first capacitor electrode CE1 and the second capacitor electrode CE2.

The first capacitor electrode CE1 may be unitary with the first driving gate electrode G11 as one body. In other words, the first capacitor electrode CE1 may include the first driving gate electrode G11. In an alternative embodiment, the first driving gate electrode G11 may include the first capacitor electrode CE1.

The second capacitor electrode CE2 may include a first sub-electrode CE2*b* and a second sub-electrode CE2*t*, the first sub-electrode CE2*b* may be disposed under the first capacitor electrode CE1, and the second sub-electrode CE2*t* may be disposed on the first capacitor electrode CE1. The first sub-electrode CE2*b* may be connected to the second sub-electrode CE2*t* through a tenth contact hole CT10.

As shown in FIG. 8, the first organic light-emitting diode OLED1 may be electrically connected to a first pixel circuit through a first via hole VH1. In an embodiment, the first electrode 211 of the first organic light-emitting diode OLED1 may be connected to the second sub-electrode CE2*t* (refer to FIG. 7) of the first storage capacitor Cst1 through the first via hole VH1.

The second driving transistor M21, the second switching transistor M22, and the second initialization-sensing transistor M23 of the second pixel circuit may have the same structure as those of the first driving transistor M11, the first switching transistor M12, and the first initialization-sensing transistor M13 described above. Likewise, the second storage capacitor Cst2 may have the same structure as that of the first storage capacitor Cst1. The second organic light-emitting diode OLED2 may be electrically connected to the second pixel circuit through a second via hole VH2 as shown in FIG. 8. In an embodiment, the first electrode 212 of the second organic light-emitting diode OLED2 may be connected to a second sub-electrode of the second storage capacitor Cst2 through the second via hole VH2.

The third driving transistor M31, the third switching transistor M32, and the third initialization-sensing transistor M33 of the third pixel circuit may have the same structure as those of the first driving transistor M11, the first switching transistor M12, and the first initialization-sensing transistor M13 described above. Likewise, the third storage capacitor Cst3 may have the same structure as that of the first storage capacitor Cst1. The third organic light-emitting diode OLED3 may be electrically connected to the third pixel circuit through a third via hole VH3 as shown in FIG. 8. In an embodiment, the first electrode 213 of the third organic light-emitting diode OLED3 may be connected to a second sub-electrode of the third storage capacitor Cst3 through the third via hole VH3.

A semiconductor layer of some of the transistors shown in FIG. 7 may overlap a line and/or an electrode arranged therebelow. A crossing region between an edge of the semiconductor layer and an edge of the line and/or a crossing region between an edge of the semiconductor layer and an edge of an electrode may overlap and/or be covered by a protection layer (also referred to as a first protection layer PL, hereinafter). With regard to this, it is shown in FIG. 7 that the first switching semiconductor layer A12 of the first switching transistor M12 crosses the second data line DL2, and a crossing region between an edge of the first switching semiconductor layer A12 and an edge of the second data line DL2 overlaps and/or is covered by the first protection layer PL. Similarly, the third switching semiconductor layer of the third switching transistor M32 may cross the first and second data lines DL1 and DL2. A crossing region between an edge of the third switching semiconductor layer and an edge of the first data line DL1, and a crossing region between an edge of the third switching semiconductor layer and an edge of the second data line DL2 may overlap and/or be covered by the first protection layer PL. The first protection layer PL may have an isolated shape in a plan view. The first protection layer PL may include the same material as that of the first capacitor electrode CE1 of the first storage capacitor Cst1, the first driving gate electrode G11 of the first driving transistor M11, the first branch SL-B, and/or the first switching gate electrode G12. In an embodiment, the first protection layer PL may include a sub-layer. The sub-layer is arranged in the same layer as the first capacitor electrode CE1 of the first storage capacitor Cst1, the first driving gate electrode G11 of the first driving transistor M11, the first branch SL-B, and/or the first switching gate electrode G12 and includes the same material as that of the first capacitor electrode CE1 of the first storage capacitor Cst1, the first driving gate electrode G11 of the first driving transistor M11, the first branch SL-B, and/or the first switching gate electrode G12.

The first driving semiconductor layer A11 of the first driving transistor M11 may cross the first sub-electrode CE2*b* of the first storage capacitor Cst1, and a crossing region CR between edges may overlap and/or be covered by a protection layer (also referred to as a second protection layer PL', hereinafter). The second protection layer PL' may be a portion of the first capacitor electrode CE1 of the first storage capacitor Cst1 and/or a portion of the first driving gate electrode G11. The second protection layer PL' may include the same material as that of the first capacitor electrode CE1 of the first storage capacitor Cst1, the first driving gate electrode G11 of the first driving transistor M11, the first branch SL-B, and/or the first switching gate electrode G12. In an embodiment, the second protection layer PL' may include a layer. The layer is arranged in the same layer as the first capacitor electrode CE1 of the first storage capacitor Cst1, the first driving gate electrode G11 of the first driving transistor M11, the first branch SL-B, and/or the first switching gate electrode G12 and includes the same material as that of the first capacitor electrode CE1 of the first storage capacitor Cst1, the first driving gate electrode G11 of the first driving transistor M11, the first branch SL-B, and/or the first switching gate electrode G12.

Similarly, the semiconductor layer of the second driving transistor M21 may cross the first sub-electrode of the second storage capacitor Cst2, and a crossing region CR between edges may overlap and/or be covered by a portion of the first capacitor electrode of the second storage capacitor Cst2 and/or the second protection layer PL', which is a portion of the second driving gate electrode. In addition, the semiconductor layer of the third driving transistor M31 may cross the first sub-electrode of the third storage capacitor Cst3, and a crossing region CR between edges may overlap and/or be covered by a portion of the first capacitor electrode of the third storage capacitor Cst3 and/or the second protection layer PL', which is a portion of the third driving gate electrode.

Figure 9:
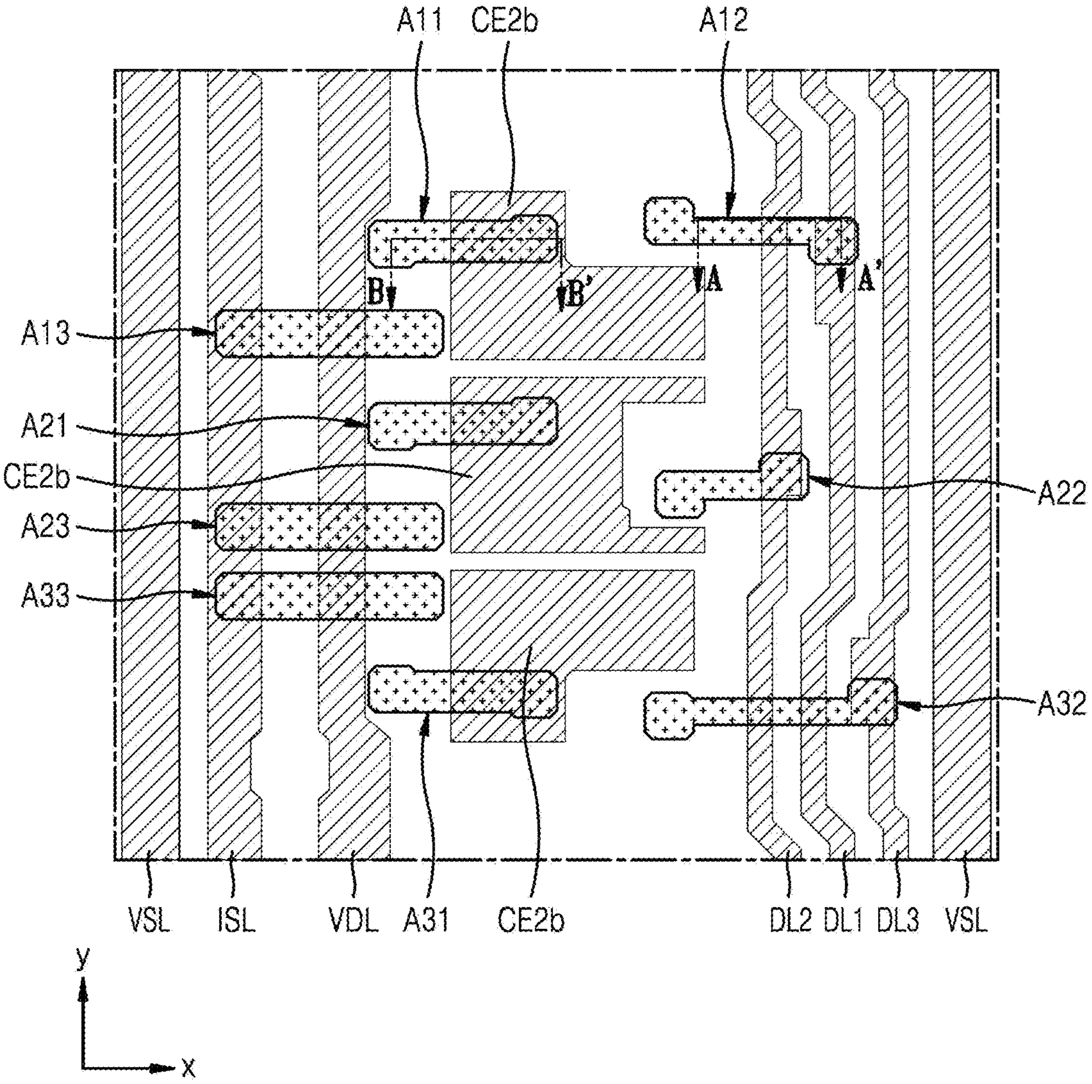
FIGS. 9, 10, and 11 are plan views showing an embodiment of a process of forming the pixel circuit shown in FIG. 7.
Figure 10:
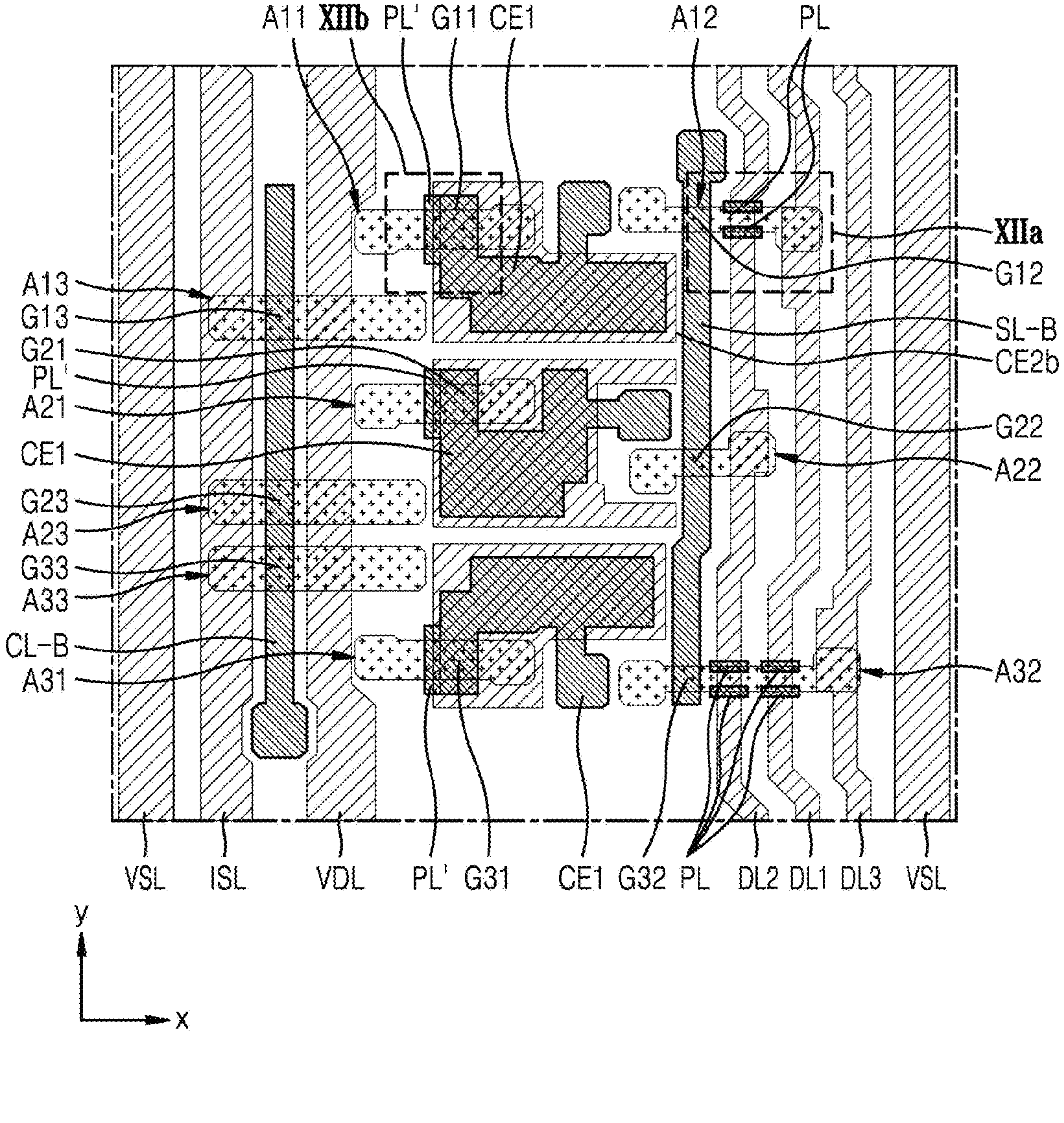
Figure 11:
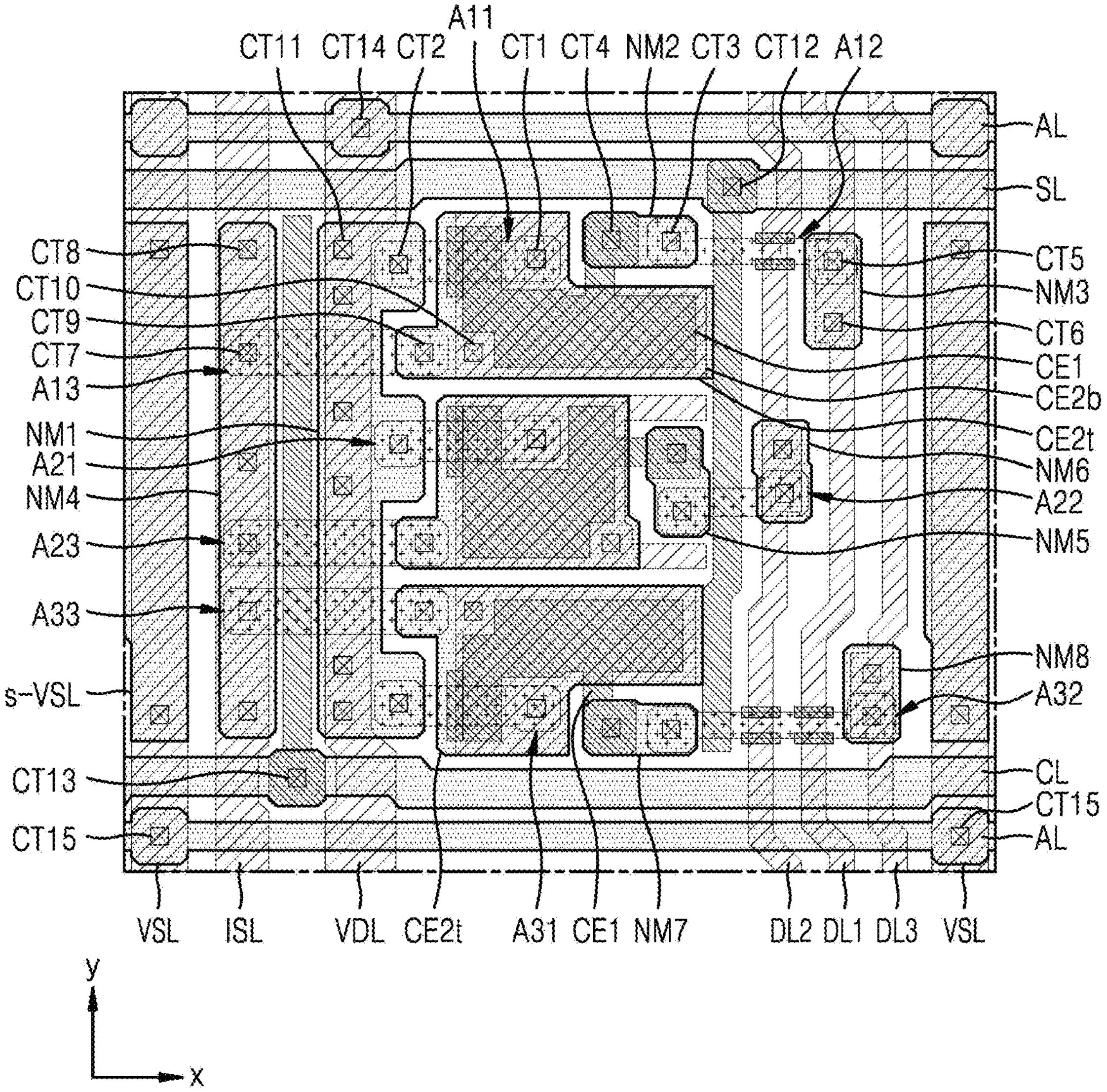
Figure 12A:
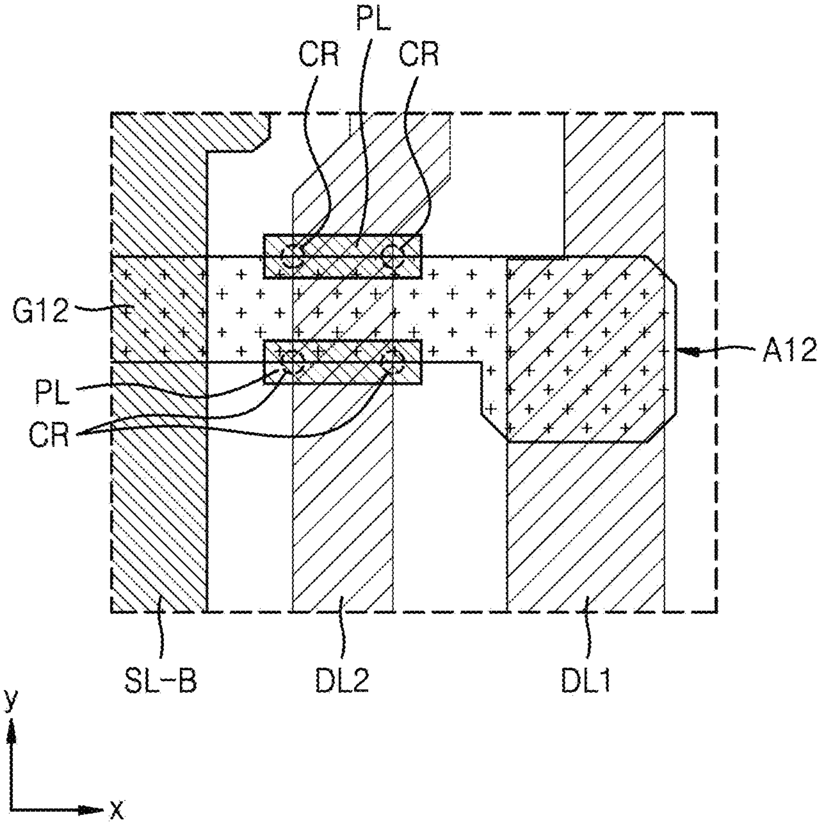
FIGS. 12A and 12B are enlarged plan views of an embodiment of a region X11*a* and a region X11*b*, respectively, of FIG. 10.
Figure 12B:
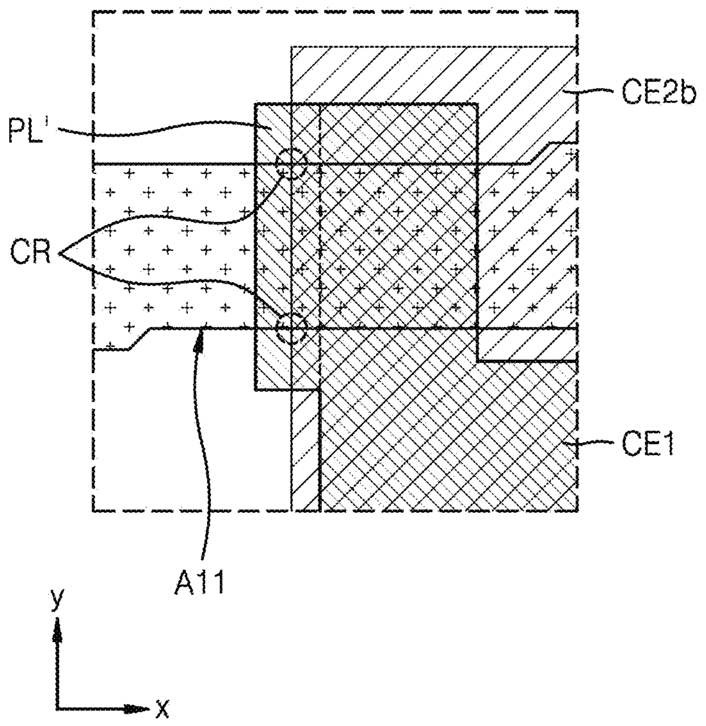
Figure 13A:
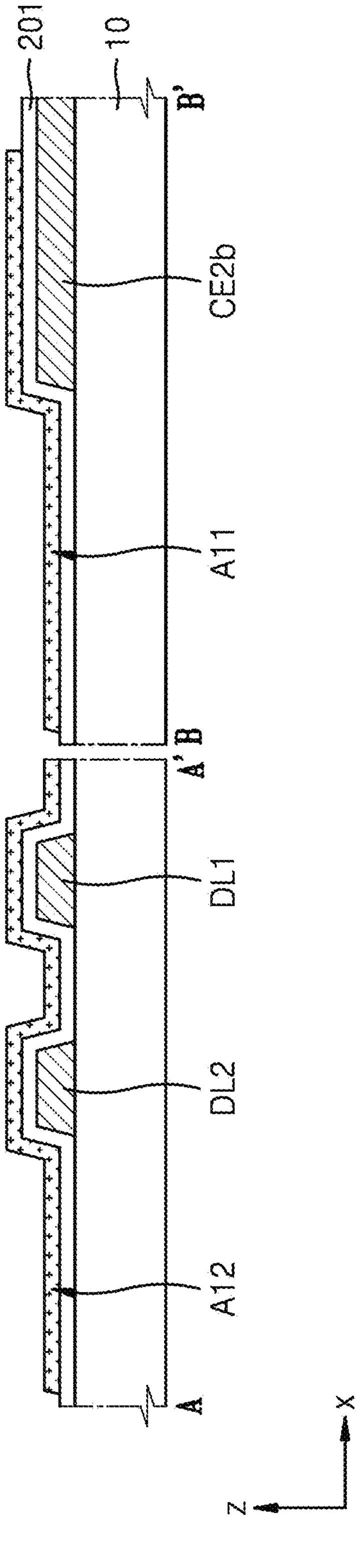
FIG. 13A is a cross-sectional view of an embodiment of the pixel circuit, taken along line A-A' and B-B' of FIG. 9.
Figure 13B:
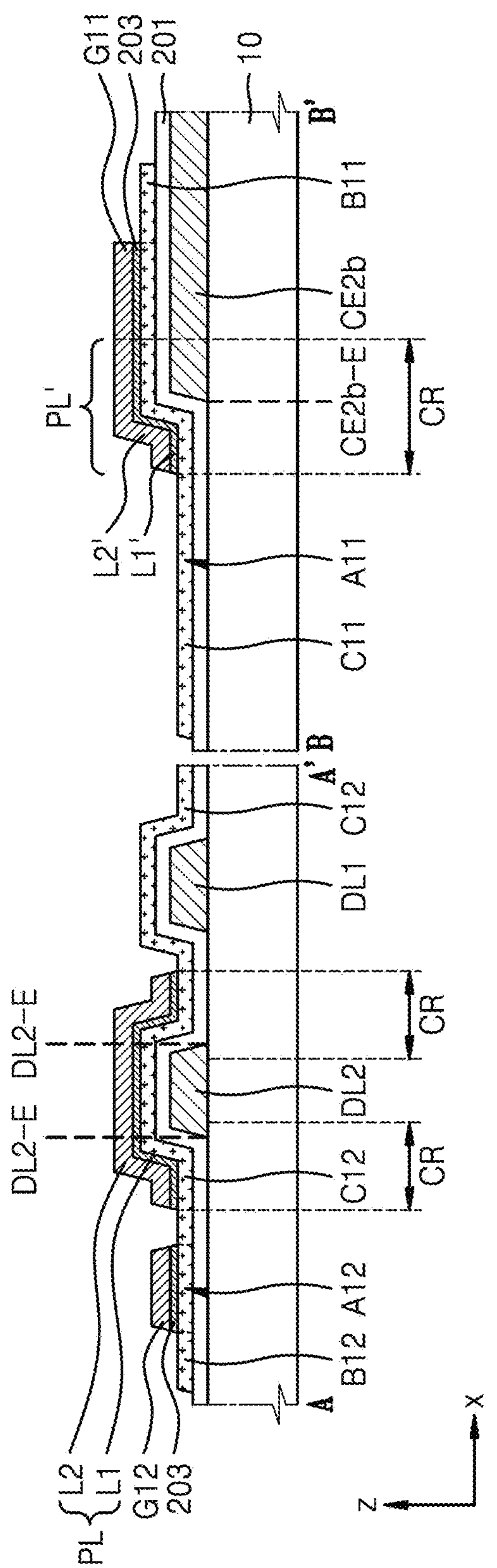
FIGS. 13B and 13C are cross-sectional views of an embodiment of a pixel corresponding to a process after the process of FIG. 13A.
Figure 13C:
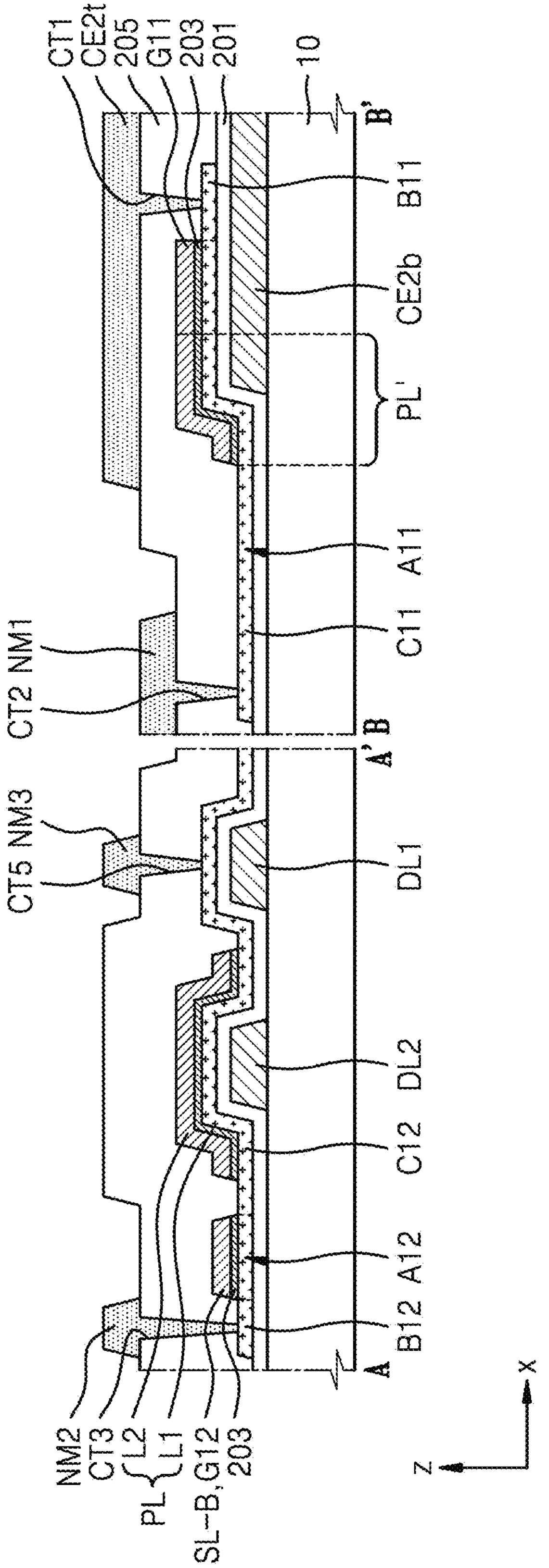
Figure 13D:
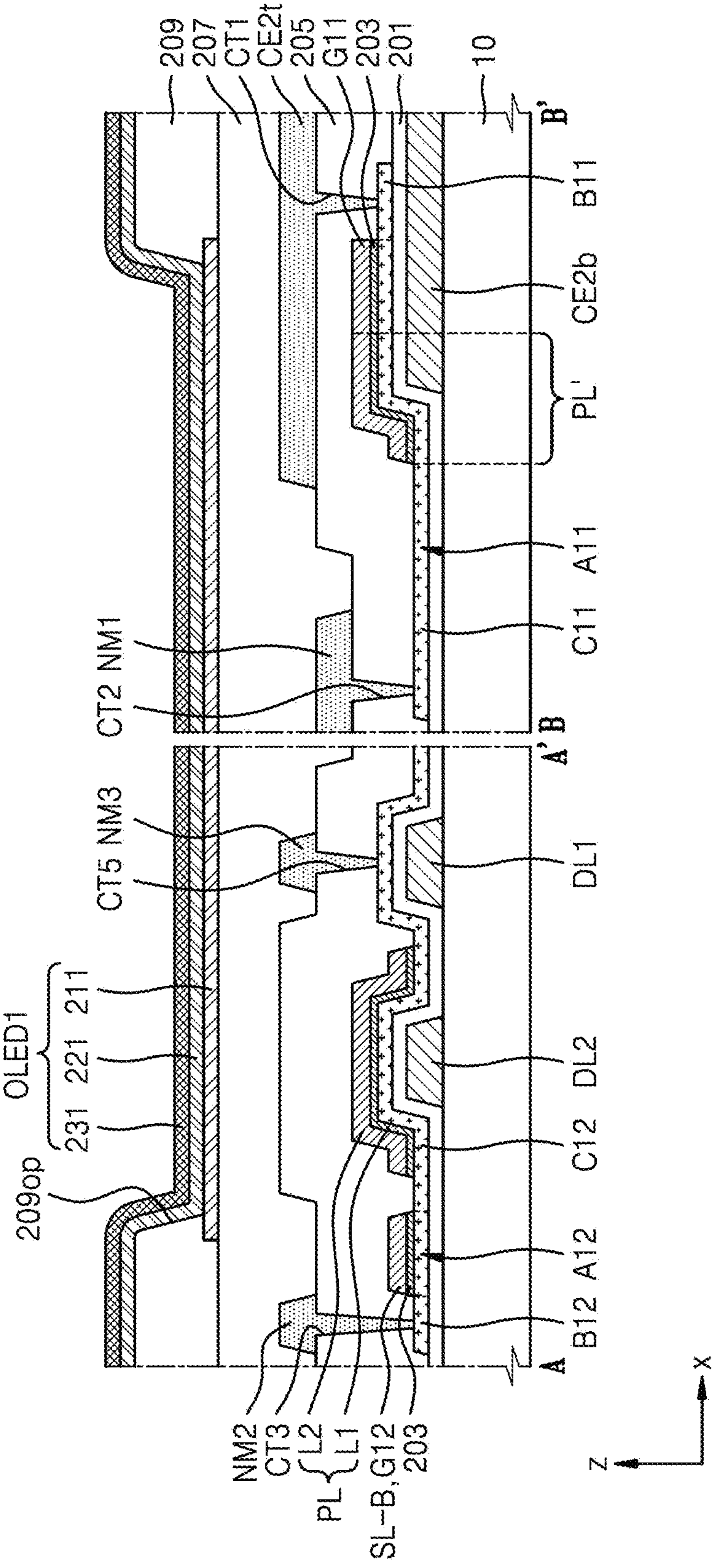
FIG. 13D is a cross-sectional view of an organic light-emitting diode disposed on the pixel circuit of FIG. 13C.

FIGS. 9, 10, and 11 are plan views showing a process of forming the pixel circuit shown in FIG. 7 in an embodiment, FIGS. 12A and 12B are enlarged plan views of a region X11*a* and a region X11*b*, respectively, of FIG. 10 in an embodiment, FIG. 13A is a cross-sectional view of the pixel circuit, taken along line A-A' and B-B' of FIG. 9 in an embodiment, FIGS. 13B and 13C are cross-sectional views of a pixel corresponding to a process after the process of FIG. 13A in an embodiment, and FIG. 13D is a cross-sectional view of an organic light-emitting diode disposed on the pixel circuit of FIG. 13C. FIG. 12A is a region X11*a* of FIG. 10, and simultaneously, may correspond to a planar shape of a structure taken along line A-A' of FIG. 13B. FIG. 12B is a region X11*b* of FIG. 10, and simultaneously, may correspond to a planar shape of a structure taken along line B-B' of FIG. 13B.

Referring to FIGS. 7, 9, and 13A, the first substrate 10 (refer to FIG. 13A) is prepared first. The first substrate 10 may include glass or a resin material. The glass may include transparent glass including $SiO_2$ as a primary component. The resin material may include a polymer resin such as polyethersulfone, polyacrylate, polyetherimide, polyethylene naphthalate, polyethylene terephthalate, polyphenylene sulfide, polyarylate, polyimide, polycarbonate, cellulose tri acetate, and cellulose acetate propionate. In the case where the first substrate 10 includes the polymer resin, the first substrate 10 may be flexible, rollable, and bendable.

Next, lines in the y-direction, for example, the first to third data lines DL1, DL2, and DL3, the common voltage line VSL, the driving voltage line VDL, and the initialization sensing line ISL may be provided over the substrate 10. In addition, the first sub-electrode CE2*b* of each of the first to third storage capacitors Cst1, Cst2, and Cst3 may be provided. With regard to this, FIG. 13A shows the first and second data lines DL1 and DL2, and the first sub-electrode CE2*b*.

The first to third data lines DL1, DL2, and DL3, the common voltage line VSL, the driving voltage line VDL, and the initialization sensing line ISL, and the first sub-electrode CE2*b* of each of the first to third storage capacitors Cst1, Cst2, and Cst3 may include the same material, for example, a metal material. In an embodiment, the metal material may include at least one of molybdenum (Mo), copper (Cu), or titanium (Ti), for example.

Then, as shown in FIG. 13A, the buffer layer 201 is provided. The buffer layer 201 may cover the first to third data lines DL1, DL2, and DL3, the common voltage line VSL, the driving voltage line VDL, and the initialization sensing line ISL, and the first sub-electrodes CE2*b*. The buffer layer 201 may include an inorganic insulating material such as silicon nitride, silicon oxide, and/or silicon oxynitride.

Next, the semiconductor layers are disposed on the buffer layer 201. In an embodiment, the first driving semiconductor layer A11 of the first driving transistor M11 (refer to FIG. 7), the first switching semiconductor layer A12 of the first switching transistor M12 (refer to FIG. 7), and the first initialization-sensing semiconductor layer A13 of the first initialization-sensing transistor M13 (refer to FIG. 7) may be provided. Likewise, the second driving semiconductor layer A21, the second switching semiconductor layer A22, and the second initialization-sensing semiconductor layer A23 may be provided, and the third driving semiconductor layer A31, the third switching semiconductor layer A32, and the third initialization-sensing semiconductor layer A33 may be provided. With regard to this, FIG. 13A shows the first switching semiconductor layer A12 and the first driving semiconductor layer A11.

In an embodiment, the semiconductor layers A11, A12, A13, A21, A22, A23, A31, A32, and A33 may be apart from each other and may include an oxide-based semiconductor material such as IGZO. However, the oxide-based semiconductor material is not limited to IGZO. In an embodiment, the oxide-based semiconductor material may include an oxide of at least one of indium (In), gallium (Ga), stannum (Sn), zirconium (Zr), vanadium (V), hafnium (Hf), cadmium (Cd), germanium (Ge), chromium (Cr), titanium (Ti), or zinc (Zn). In another embodiment, the semiconductor layers A11, A12, A13, A21, A22, A23, A31, A32, and A33 may include a silicon-based material.

Referring to FIGS. 7, 10, and 13B, the first capacitor electrode CE1, the first branch SL-B, and the second branch CL-B may be provided over the first substrate 10. In an embodiment, the first capacitor electrode CE1, the first branch SL-B, and the second branch CL-B may include at least one of molybdenum (Mo), copper (Cu), or titanium (Ti) and include a single-layered structure or a multi-layered structure including the above materials.

The first capacitor electrodes CE1 of the first to third storage capacitors Cst1, Cst2, and Cst3 (refer to FIG. 7) may be apart from each other in the y-direction and may overlap the first sub-electrode CE2*b* (refer to FIG. 9) therebelow.

The first capacitor electrodes CE1 of the first to third storage capacitors Cst1, Cst2, and Cst3 (refer to FIG. 7) may be unitary with first to third driving gate electrodes G11, G21, and G31 of the first to third driving transistors M11, M21, and M31 (refer to FIG. 7), respectively, as one body. In other words, the first capacitor electrodes CE1 of the first to third storage capacitors Cst1, Cst2, and Cst3 (refer to FIG. 7) may include the first to third driving gate electrodes G11, G21, and G31, respectively. In an alternative embodiment, the first to third driving gate electrodes G11, G21, and G31 of the first to third driving transistors M11, M21, and M31 may each include the first capacitor electrode CE1.

As shown in FIG. 10, the first branch SL-B and the second branch CL-B may extend in the y-direction and include a gate electrode of some transistors. In an embodiment, the first branch SL-B may include first to third switching gate electrodes G12, G22, and G32 of the first to third switching transistors M12, M22, and M32. The second branch CL-B may include first to third initialization-sensing gate switching electrodes G13, G23, and G33 of the first to third initialization-sensing transistors M13, M23, and M33. With regard to this, FIG. 13B shows a portion of the first branch SL-B, for example, the first switching gate electrode G12 and the first driving gate electrode G11.

Referring to the cross-section of the pixel circuit, taken along line A-A' of FIG. 13B, the first switching gate electrode G12 may overlap the first switching semiconductor layer A12 with a gate insulating layer 203 thereunder. A region of the first switching semiconductor layer A12 that overlaps the first switching gate electrode G12 may correspond to a first switching channel region, the left side of the first switching channel region may correspond to the first low-resistance region B12, and the right side of the first switching channel region may correspond to the second low-resistance region C12. The gate insulating layer 203 may include an inorganic insulating material such as silicon nitride, silicon oxide, and/or silicon oxynitride and include a single-layered structure or a multi-layered structure including the above materials.

Referring to the cross-section of the pixel circuit, taken along line B-B' of FIG. 13B, the first driving gate electrode G11 may overlap the first driving semiconductor layer A11 with the gate insulating layer 203 therebetween. A region of the first driving semiconductor layer A11 that overlaps the first driving gate electrode G11 may correspond to a first driving channel region, the right side of the first driving channel region may correspond to the first low-resistance region B11, and the left side of the first driving channel region may correspond to the second low-resistance region C11.

As shown in FIG. 10, the first to third switching semiconductor layers A12, A22, and A32 of the first to third switching transistors M12, M22, and M32 may extend in the x-direction to cross the first branch SL-B. Some of the switching semiconductor layers may cross a data line.

In an embodiment, as shown in FIGS. 10 and 12A, the first switching semiconductor layer A12 may extend in the x-direction and cross the second data line DL2 arranged below the first switching semiconductor layer A12. A crossing region CR of an edge of the first switching semiconductor layer A12 and an edge of the second data line DL2 may overlap or be covered by the first protection layer PL. As shown in FIG. 12A, four crossing regions CR in which an edge of the first switching semiconductor layer A12 crosses an edge of the second data line DL2 may overlap or be covered by the first protection layer PL. As described with reference to FIGS. 3A and 3B, it is shown in FIG. 12A that the first protection layer PL overlaps and/or covers two crossing regions CR. In another embodiment, as described with reference to FIG. 6A, four first protection layers PL may overlap and/or cover four crossing regions CR. In an alternative embodiment, four crossing regions CR may overlap and/or be covered by one first protection layer PL.

The first protection layer PL may be arranged even in the third switching transistor M32. As shown in FIG. 10, the third switching semiconductor layer A32 may extend in the x-direction and cross the first and second data lines DL1 and DL2 arranged under the third switching semiconductor layer A32. Crossing regions between an edge of the third switching semiconductor layer A32 and edges of the first and second data lines DL1 and DL2 may overlap or be covered by the first protection layer PL. The first protection layer PL may overlap or cover crossing regions of an edge of the third switching semiconductor layer A32 and an edge of the first data line DL1, and overlap or cover crossing regions of an edge of the third switching semiconductor layer A32 and edges of the second data line DL2.

The first protection layers PL may have an isolated shape in a plan view. Each of the first protection layers PL may cover and overlap a crossing region of an edge of the first switching semiconductor layer A12 and an edge of the second data line DL2, a crossing region of an edge of the third switching semiconductor layer A32 and an edge of the first data line DL1, and a crossing region of an edge of the third switching semiconductor layer A32 and an edge of the second data line DL2.

The second protection layer PL' may overlap or cover a crossing region between an edge of the first driving semiconductor layer A11 and an edge of an electrode disposed thereunder. In an embodiment, the second protection layer PL' may overlap or cover a crossing region between an edge of the first driving semiconductor layer A11 and an edge of the first sub-electrode CE2*b* of the first storage capacitor Cst1.

Referring to FIGS. 10 and 12B, the first driving semiconductor layer A11 may extend in the x-direction and cross a portion of the second capacitor arranged under the first driving semiconductor layer A11, for example, the first sub-electrode CE2*b*. The crossing region of an edge of the first driving semiconductor layer A11 and the first sub-electrode CE2*b* may overlap or be covered by the second protection layer PL'. The second protection layer PL' may be unitary with the first driving gate electrode G11 as one body. In other words, a portion of the first driving gate electrode G11 may include the second protection layer PL'. When a crossing region of an edge of the first driving semiconductor layer A11 and an edge of the first sub-electrode CE2*b* overlaps or is covered by the second protection layer PL', it may mean that the crossing region of the edge of the first driving semiconductor layer A11 and the edge of the first sub-electrode CE2*b* overlaps or is covered by the first driving gate electrode G11.

The structure shown in FIG. 12B is equally applicable to a structure around the second driving semiconductor layer A21 and a structure around the third driving semiconductor layer A31. In an embodiment, as shown in FIG. 10, the second driving semiconductor layer A21 may cross the first sub-electrode CE2*b* of the second storage capacitor Cst2 (refer to FIG. 7) electrically connected to the second driving transistor M21 (refer to FIG. 7). A crossing region of an edge of the second driving semiconductor layer A21 and an edge of the first sub-electrode CE2*b* of the second storage capacitor Cst2 may also overlap or be covered by the second protection layer PL'. Likewise, the second protection layer PL' may overlap or cover a crossing region of the third driving semiconductor layer A31 and the first sub-electrode CE2*b* of the third storage capacitor Cst3 electrically connected to the third driving transistor.

FIG. 13B shows the first and second protection layers PL and PL' arranged in the crossing region CR.

Referring to a cross-section of the pixel circuit, taken along line A-A' of FIG. 13B, the first protection layer PL may overlap or cover a crossing region CR of an edge of the first switching semiconductor layer A12 and an edge of the second data line DL2. The first protection layer PL may extend to pass across an edge DL2-E of the second data line DL2 in an extension direction (the x-direction) of the first switching semiconductor layer A12. Similarly, referring to a cross-section of the pixel circuit, taken along line B-B', the second protection layer PL' may overlap or cover a crossing region CR of an edge of the first driving semiconductor layer A11 and an edge of the first sub-electrode CE2*b*. The second protection layer PL' may extend to pass across an edge CE2*b*-E of the first sub-electrode CE2*b* in the extension direction (the x-direction) of the first driving semiconductor layer A11.

The first and second protection layers PL and PL' may each include two layers. In an embodiment, the first and second protection layers PL and PL' may respectively include first sub-layers L1 and L1' and second sub-layers L2 and L2' on the first sub-layers L1 and L1'. The first sub-layers L1 and L1' may include an insulating material such as an inorganic insulating material. The second sub-layers L2 and L2' may include a conductive material such as metal.

The first and second protection layers PL and PL' may be provided through the same mask process as a mask process of forming the first branch SL-B, the second branch CL-B, and the first capacitor electrode CE1. In this case, the first sub-layers L1 and L1' of the first and second protection layers PL and PL' may include the same material as that of the gate insulating layer 203. The second sub-layers L2 and L2' of the first and second protection layers PL and PL' may include the same material as that of the gate electrode. In an embodiment, the first sub-layers L1 and L may include an inorganic insulating material such as silicon nitride, silicon oxide, and/or silicon oxynitride and include a single-layered structure or a multi-layered structure including the above materials. In an embodiment, the second sub-layers L2 and L2' may include at least one of molybdenum (Mo), copper (Cu), or titanium (Ti) and include a single-layered structure or a multi-layered structure including the above materials, for example.

The first protection layer PL may overlap the second low-resistance region C12 of the first switching semiconductor layer A12. The first and second sub-layers L1 and L2 of the first protection layer PL may each be apart from the gate insulating layer 203 and the first switching gate electrode G12. The first sub-layer L1 of the first protection layer PL may be arranged in the same layer as the gate insulating layer 203 and may include the same material as that of the gate insulating layer 203. Referring to FIGS. 7, 10, and 13B, the second sub-layer L2 of the first protection layer PL may include the same material as that of the first capacitor electrode CE1 of the first storage capacitor Cst1, the first driving gate electrode G11 of the first driving transistor M11, and/or the first switching gate electrode G12. Since the first switching gate electrode G12 is a portion of the first branch SL-B, the second sub-layer L2 of the first protection layer PL may include the same material as that of the first branch SL-B.

The second protection layer PL' may overlap the first driving channel region of the first driving semiconductor layer A11. The first and second sub-layers L1' and L2' of the second protection layer PL' may be provided as one bodies with the gate insulating layer 203 and the first driving gate electrode G11, respectively. The first sub-layer L1' of the second protection layer PL' may be arranged in the same layer as the gate insulating layer 203 and may include the same material as that of the gate insulating layer 203. Referring to FIGS. 7, 10, and 13B, the second sub-layer L2' of the second protection layer PL' may include the same material as that of the first capacitor electrode CE1 of the first storage capacitor Cst1, the first driving gate electrode G11 of the first driving transistor M11, and/or the first switching gate electrode G12. Since the first switching gate electrode G12 is a portion of the first branch SL-B, the second sub-layer L2' of the second protection layer PL' may include the same material as that of the first branch SL-B.

Though it is shown in FIG. 13B that the first and second protection layers PL and PL' are provided through the same mask process as a mask process of forming the first branch SL-B, the second branch CL-B, and the first capacitor electrode CE1, the invention is not limited thereto. In another embodiment, the first and second protection layers PL and PL' may be provided through a mask process different from a mask process of forming the first branch SL-B, the second branch CL-B, and the first capacitor electrode CE1. In this case, the first and second protection layers PL and PL' may be a single layer including the first sub-layers L1 and L1' as described with reference to FIG. 4A. In an embodiment, the first and second protection layers PL and PL' may include only an insulating material such as an inorganic insulating material.

Referring to FIGS. 7, 11, and 13C, an inter-insulating layer 205 is disposed over the first substrate 10. The inter-insulating layer 205 may include an inorganic insulating material such as silicon nitride, silicon oxide, and/or silicon oxynitride.

Then, the scan line SL, the control line CL, the auxiliary line AL, the second sub-electrode CE2*t* of the second capacitor electrode CE2, and first to ninth connectors NM1, NM2, NM3, NM4, NM5, NM6, NM7, NM8, and NM9 may be disposed on the inter-insulating layer 205. With regard to this, FIG. 13C shows the second sub-electrode CE2*t*, and the first to third connectors NM1, NM2, and NM3. In an embodiment, the scan line SL, the control line CL, the auxiliary line AL, the second sub-electrode CE2*t* of the second capacitor electrode CE2, and the first to ninth connectors NM1, NM2, NM3, NM4, NM5, NM6, NM7, NM8, and NM9 may include at least one of molybdenum (Mo), copper (Cu), or titanium (Ti) and include a single-layered structure or a multi-layered structure including the above materials, for example.

The scan line SL may be electrically connected to the first branch SL-B through a twelfth contact hole CT12 defined in the inter-insulating layer 205. The control line CL may be electrically connected to the second branch CL-B through a thirteenth contact hole CT13 defined in the inter-insulating layer 205.

The auxiliary lines AL may be electrically connected to the driving voltage line VDL and the common voltage line VSL. In an embodiment, the auxiliary line AL arranged on the upper portion of FIG. 11 may be connected to the driving voltage line VDL through a fourteenth contact hole CT14 defined in the inter-insulating layer 205. The auxiliary line AL arranged on the lower portion may be connected to the driving voltage line VDL through a fifteenth contact hole CT15 defined in the inter-insulating layer 205.

The second sub-electrodes CE2*t* corresponding to the first to third storage capacitors Cst1, Cst2, and Cst3 may be arranged in the y-direction. The second sub-electrode CE2*t* may overlap the first sub-electrode CE2*b* and be connected to the first sub-electrode CE2*b* through a tenth contact hole CT10 defined in the inter-insulating layer 205. The first sub-electrode CE2*b* and the second sub-electrode CE2*t* may have the same voltage level.

As shown in FIGS. 11 and 13C, the first low-resistance region B11 (refer to FIG. 13C) of the first driving semiconductor layer A11 may be connected to a portion of the second sub-electrode CE2*t* through the first contact hole CT1 defined in the inter-insulating layer 205. The second low-resistance region C11 of the first driving semiconductor layer A11 may be connected to the first connector NM1 through the second contact hole CT2 defined in the inter-insulating layer 205. Since the first connector NM1 is connected to the driving voltage line VDL through the eleventh contact hole CT11, the first connector NM1 may have the same voltage level as that of the driving voltage line VDL.

As shown in FIGS. 11 and 13C, the first low-resistance region B12 of the first switching semiconductor layer A12 may be connected to a portion of the second connector NM2 through the third contact hole CT3 defined in the inter-insulating layer 205. Another portion of the second connector NM2 may be connected to the first capacitor electrode CE1 through the fourth contact hole CT4. The second low-resistance region C12 of the first switching semiconductor layer A12 may be connected to a portion of the third connector NM3 through the fifth contact hole CT5 defined in the inter-insulating layer 205. Another portion of the third connector NM3 may be connected to the first data line DL1 through the sixth contact hole CT6.

The first low-resistance region of the first initialization-sensing semiconductor layer A13 may be connected to a portion of the fourth connector NM4 through the seventh contact hole CT7 defined in the inter-insulating layer 205. The fourth connector NM4 may be connected to the initialization sensing line ISL through the eighth contact hole CT8. The fourth connector NM4 may have the same voltage level as that of the initialization sensing line ISL.

The second low-resistance region of the first initialization-sensing semiconductor layer A13 may be connected to the second sub-electrode CE2*t* of the second capacitor electrode through the ninth contact hole CT9 defined in the inter-insulating layer 205.

A predetermined structure of each of the first driving semiconductor layer A11, the first switching semiconductor layer A12, the first initialization-sensing semiconductor layer A13, and the second sub-electrode CE2*t* of the first storage capacitor described with reference to FIGS. 11 and 13C may be the same as a structure of each of the second driving semiconductor layer A21, the second switching semiconductor layer A22, the second initialization-sensing semiconductor layer A23, and the second sub-electrode CE2*t* of the second storage capacitor.

In an embodiment, first and second low-resistance regions of the second driving semiconductor layer A21 may be respectively connected to the first connector NM1 and the second sub-electrode CE2*t* of the second storage capacitor Cst2 (refer to FIG. 7) through contact holes. First and second low-resistance regions of the second switching semiconductor layer A22 may be respectively connected to the fifth connector NM5 and the sixth connector NM6 through contact holes. The fifth connector NM5 may be connected to the first capacitor electrode CE1 of the second storage capacitor Cst2 (refer to FIG. 7) through a contact hole, and the sixth connector NM6 may be connected to the second data line DL2 through a contact hole. First and second low-resistance regions of the second initialization-sensing semiconductor layer A23 may be respectively connected to the fourth connector NM4 and the second sub-electrode CE2*t* of the second storage capacitor Cst2 (refer to FIG. 7) through contact holes.

Likewise, the structures of the third driving semiconductor layer A31, the third switching semiconductor layer A32, the third initialization-sensing semiconductor layer A33, and the second sub-electrode CE2*t* of the third storage capacitor are the same as the structures of the first driving semiconductor layer A11, the first switching semiconductor layer A12, the first initialization-sensing semiconductor layer A13, and the second sub-electrode CE2*t* of the first storage capacitor described above with reference to FIGS. 11 and 13C.

First and second low-resistance regions of the third driving semiconductor layer A31 may be respectively connected to the first connector NM1 and the second sub-electrode CE2*t* of the third storage capacitor Cst3 (refer to FIG. 7). First and second low-resistance regions of the third switching semiconductor layer A32 may be respectively connected to the seventh connector NM7 and the eighth connector NM8 through contact holes. The seventh connector NM7 may be connected to the first capacitor electrode CE1 of the third storage capacitor Cst3 (refer to FIG. 7) through a contact hole, and the eighth connector NM8 may be connected to the third data line DL3 through a contact hole. First and second low-resistance regions of the third initialization-sensing semiconductor layer A33 may be respectively connected to the fourth connector NM4 and the second sub-electrode CE2*t* of the third storage capacitor Cst3 (refer to FIG. 7).

The common voltage line VSL may be connected to a sub-line s-VSL to reduce a resistance of the common voltage line VSL itself. The sub-line s-VSL may be disposed on the inter-insulating layer 205 (refer to FIG. 13C) described with reference to FIG. 13C and simultaneously provided during a process shown in FIG. 11.

Referring to FIG. 13D, a via-insulating layer 207 is disposed on the structure described with reference to FIGS. 11 and 13C, and then an organic light-emitting diode may be disposed on the via-insulating layer 207. With regard to this, FIG. 13D shows the first organic light-emitting diode OLED1 on the via-insulating layer 207.

The via-insulating layer 207 may include an organic insulating material. In an embodiment, the organic insulating material may include a general-purpose polymer such as polymethylmethacrylate ("PMMA") or polystyrene ("PS"), polymer derivatives having a phenol-based group, an acryl-based polymer, an imide-based polymer, an aryl ether-based polymer, an amide-based polymer, a fluorine-based polymer, a p-xylene-based polymer, a vinyl alcohol-based polymer, or a combination thereof.

In an embodiment, a first electrode 211 of the first organic light-emitting diode OLED1 may include a transparent conductive oxide such as indium tin oxide ("ITO"), indium zinc oxide ("IZO"), zinc oxide (ZnO), indium oxide ($In_2O_3$), indium gallium oxide ("IGO"), or aluminum zinc oxide ("AZO"). In another embodiment, the first electrode 211 of the first organic light-emitting diode OLED1 may include a reflective layer including magnesium (Mg), silver (Ag), aluminum (Al), platinum (Pt), palladium (Pd), gold (Au), nickel (Ni), neodymium (Nd), iridium (Ir), chrome (Cr), or a combination thereof. In another embodiment, the first electrode 211 of the first organic light-emitting diode OLED1 may further include a layer on/under the reflective layer, and the layer may include ITO, IZO, ZnO, or $In_2O_3$, for example. In an embodiment, the first electrode 211 of the first organic light-emitting diode OLED1 may have a three-layered structure of an ITO layer, an Ag layer, and an ITO layer that are stacked.

An edge of the first electrode 211 may overlap or be covered by a top insulating layer 209. An opening 209*op* that overlaps the first electrode 211 may be defined in the top insulating layer 209. The opening 209*op* of the top insulating layer 209 may define an emission area of the first organic light-emitting diode OLED1.

An emission layer 221 may overlap the first electrode 211 through the opening 209*op*. The emission layer 221 may include a polymer or a low molecular weight organic material that emits blue light. The emission layer 221 may cover the first substrate 10 entirely. In an embodiment, the emission layer 221 may be provided as one body to entirely cover the first to third organic light-emitting diodes OLED1, OLED2, and OLED3 (refer to FIG. 8) described with reference to FIG. 8.

A second electrode 231 of the first organic light-emitting diode OLED1 may be a semi-transmissive or transmissive electrode. In an embodiment, the second electrode 231 may be a semi-transmissive electrode including an ultra-thin layer including magnesium (Mg), silver (Ag), aluminum (Al), platinum (Pt), palladium (Pd), gold (Au), nickel (Ni), neodymium (Nd), iridium (Ir), chrome (Cr), or a combination thereof, for example. In an embodiment, the second electrode 231 of the first organic light-emitting diode OLED1 may include a transparent conductive oxide such as ITO, IZO, zinc oxide (ZnO), indium oxide ($In_2O_3$), IGO, or AZO.

The second electrode 231 may be provided to cover the first substrate 10 entirely. In an embodiment, the second electrode 231 may be provided as one body to entirely cover the first to third organic light-emitting diodes OLED1, OLED2, and OLED3 (refer to FIG. 8) described with reference to FIG. 8.

Figure 14:
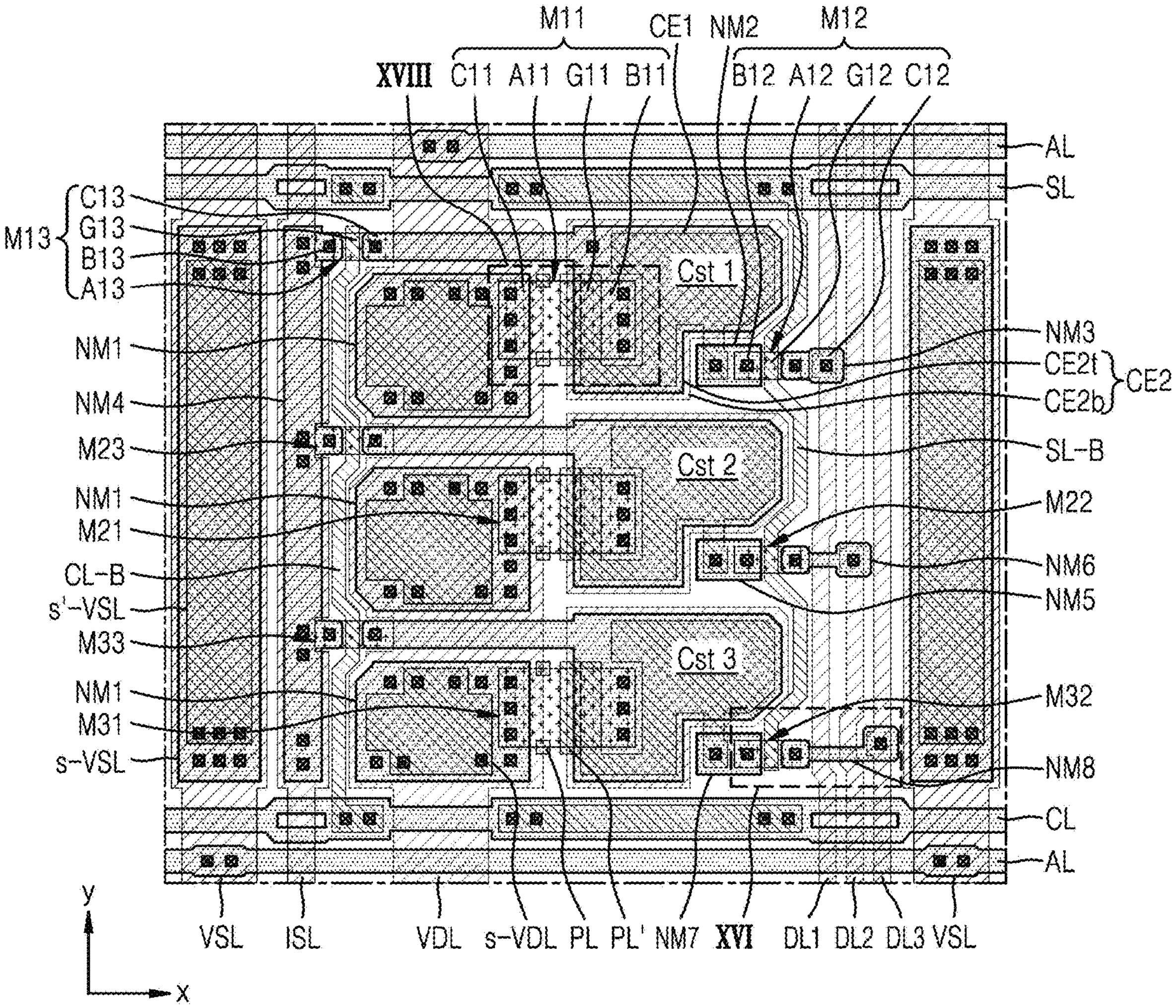
FIG. 14 is a plan view of another embodiment of pixel circuits of a light emission panel.
Figure 16:
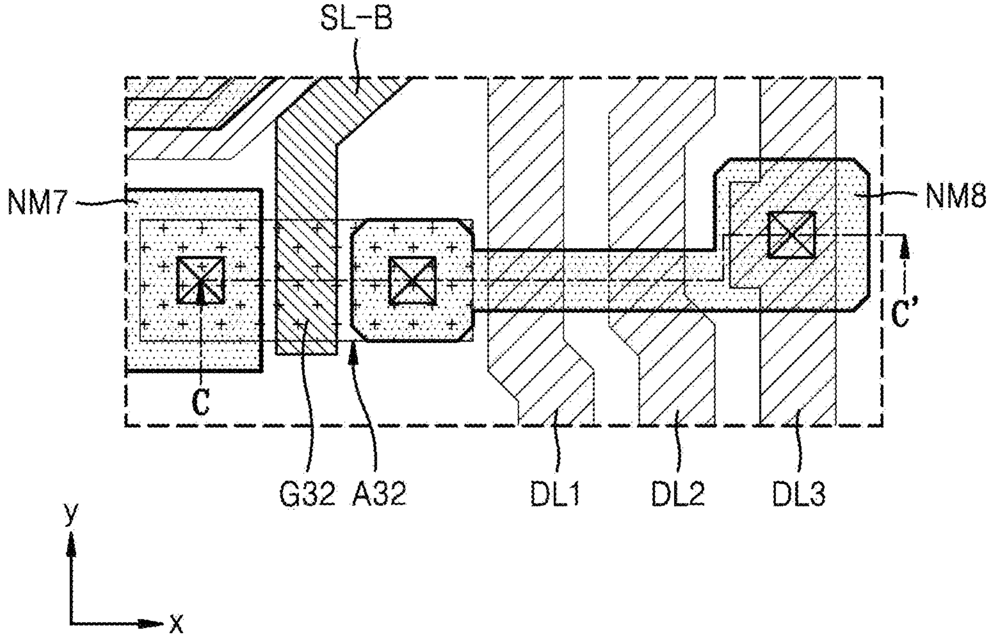
FIG. 16 is a cross-sectional view of a region XVI of FIG. 14.

In an embodiment, though FIGS. 7 to 13D show the first protection layer PL arranged in a crossing region of an edge of a switching thin-film transistor, for example, the first and third switching semiconductor layers A12 and A32 of the first to third switching thin-film transistors M12 and M32, and an edge of a data line(s) thereunder, the forming of the cavity 205*v* of the inter-insulating layer 205 described above with reference to FIGS. 3A to 5, and an issue thereto may be resolved through the connector as shown in FIGS. 14 and 16 as follows.

Figure 15:
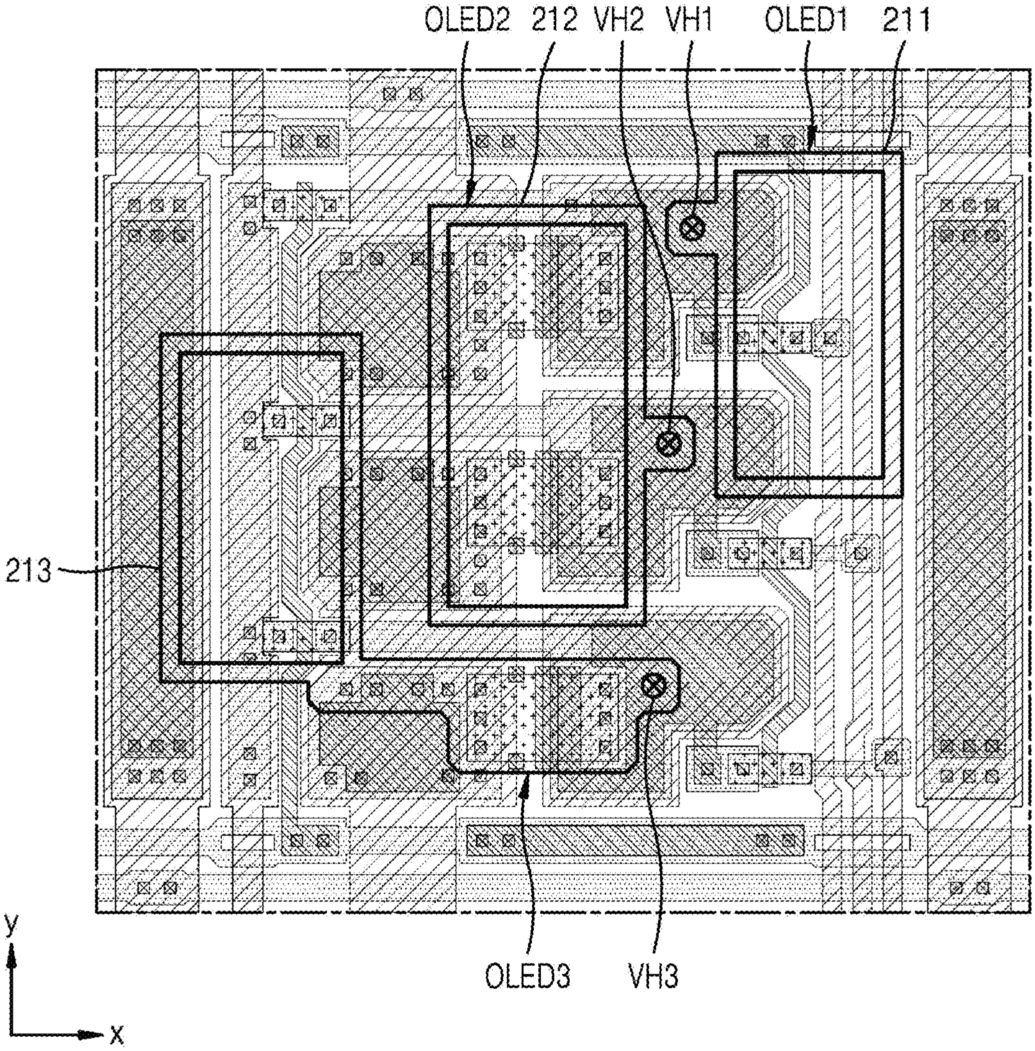
FIG. 15 is a plan view of another embodiment of light-emitting diodes connected to the pixel circuits of FIG. 14.

FIG. 14 is a plan view of pixel circuits of another embodiment of a light emission panel, and FIG. 15 is a plan view of another embodiment of light-emitting diodes connected to the pixel circuits of FIG. 14. In an embodiment, FIG. 15 describes the case where a light-emitting diode is an organic light-emitting diode.

The pixel circuits shown in FIG. 14 may have the same structure as that of the pixel circuit described with reference to FIG. 7. The scan line SL, the control line CL, and the auxiliary line AL may extend in the x-direction. In an embodiment, the first to third data lines DL1, DL2, and DL3 may be arranged in the x-direction crossing the y-direction and extend in the y-direction. The initialization sensing line ISL, the driving voltage line VDL, and the common voltage line VSL may extend in the y-direction.

Two adjacent common voltage lines VSL may be apart from each other. The first to third data lines DL1, DL2, and DL3, the initialization sensing line ISL, and the driving voltage line VDL may be arranged between the two adjacent common voltage lines VSL. The initialization sensing line ISL and the driving voltage line VDL may be adjacent to one of the common voltage lines VSL while being adjacent to each other. The first to third data lines DL1, DL2, and DL3 may be adjacent to another common voltage line VSL while being adjacent to one another. The initialization sensing line ISL and the driving voltage line VDL may be arranged on one side (e.g., the left side) around the first to third storage capacitors Cst1, Cst2, and Cst3, and the first to third data lines DL1, DL2, and DL3 may be arranged on another side (e.g., the right side).

Referring to FIGS. 14 and 15, the first organic light-emitting diode OLED1 may be electrically connected to the first pixel circuit through the first via hole VH1. The first pixel circuit may include the first driving transistor M11, the first switching transistor M12, the first initialization-sensing transistor M13, and the first storage capacitor Cst1.

The first driving transistor M11 may include the first driving semiconductor layer A11 and the first driving gate electrode G11. A predetermined structure of the first driving transistor M11 may be the same as that of the first driving transistor M11 described above with reference to FIGS. 7 to 11.

The first switching transistor M12 may include the first switching semiconductor layer A12 and the first switching gate electrode G12. A predetermined structure of the first switching transistor M12 may be the same as that of the first switching transistor M12 described above with reference to FIGS. 7 to 11.

The first initialization-sensing transistor M13 may include the first initialization-sensing semiconductor layer A13 and the first initialization-sensing gate electrode G13. A predetermined structure of the first initialization-sensing transistor M13 may be the same as that of the first initialization-sensing transistor M13 described above with reference to FIGS. 7 to 11.

The first storage capacitor Cst1 may include the first capacitor electrode CE1 and the second capacitor electrode CE2. The second capacitor electrode CE2 may include the first sub-electrode CE2*b* and the second sub-electrode CE2*t*, the first sub-electrode CE2*b* may be disposed under the first capacitor electrode CE1, and the second sub-electrode CE2*t* may be disposed on the first capacitor electrode CE1. Electric connection relationship between the electrodes of the first storage capacitor Cst1 and the transistors are the same as that described above with reference to FIGS. 7 to 11.

The second organic light-emitting diode OLED2 may be electrically connected to the second pixel circuit through the second via hole VH2. The second pixel circuit may include the second driving transistor M21, the second switching transistor M22, the second initialization-sensing transistor M23, and the second storage capacitor Cst2. Likewise, the third organic light-emitting diode OLED3 may be electrically connected to the third pixel circuit through the third via hole VH3. The third pixel circuit may include the third driving transistor M31, the third switching transistor M32, the third initialization-sensing transistor M33, and the third storage capacitor Cst3.

The second driving transistor M21 and the third driving transistor M31 may have the same structure as that of the first driving transistor M11. The second switching transistor M22 and the third switching transistor M32 may have the same structure as that of the first switching transistor M12. The second initialization-sensing transistor M23 and the third initialization-sensing transistor M33 may have the same structure as that of the first initialization-sensing transistor M13.

Electric connection structures between the first to third driving transistors M11, M21, and M31, the first to third switching transistors M12, M22, and M32, the first to third initialization-sensing transistors M13, M23, and M33, and neighboring electrodes, for example, the first to eighth connectors NM1, NM2, NM3, NM4, NM5, NM6, NM7, and NM8, the first capacitor electrode CE1, the first sub-electrode CE2*b*, and the second sub-electrode CE2*t* are the same as those described above with reference to FIGS. 7 to 13D.

Unlike the structure shown in FIG. 7, FIG. 14 shows a structure in which a plurality of first connectors NM1 is connected to the driving voltage line VDL. A sub-driving voltage line s-VDL may be electrically connected to the driving voltage line VDL while overlapping the driving voltage line VDL to reduce a resistance of the driving voltage line VDL itself. To reduce a resistance of the driving voltage line VDL itself, a first sub-common voltage line s-VSL and a second sub-common voltage line s'-VSL may be electrically connected to the common voltage line VSL while overlapping the common voltage line VSL. The sub-driving voltage line s-VDL and the second sub-common voltage line s'-VSL may be provided simultaneously during a process of forming the gate electrode and/or the first capacitor electrode CE1 and may include the same material as that of the gate electrode and/or the first capacitor electrode CE1.

Referring to the pixel circuits described with reference to FIG. 14, unlike the pixel circuit described above with reference to FIG. 7, the switching semiconductor layer may not cross one of the data lines arranged thereunder, and accordingly, the forming of the cavity 205*v* of the inter-insulating layer 205 described above with reference to FIGS. 3A to 5, and an issue thereto may be prevented. With regard to this, description is made at the relevant section with reference to FIG. 16.

Referring to the pixel circuits described with reference to FIG. 14, the driving semiconductor layer may cross the driving voltage line VDL, and a crossing region between edges may overlap or be covered by the protection layer PL. In addition, the driving semiconductor layer may cross a portion of the second capacitor electrode, for example, the second sub-electrode CE2*t*, and a crossing region between edges may overlap or be covered by the protection layer PL'. With regard to this, description is made at the relevant section with reference to FIG. 18.

Figure 17:
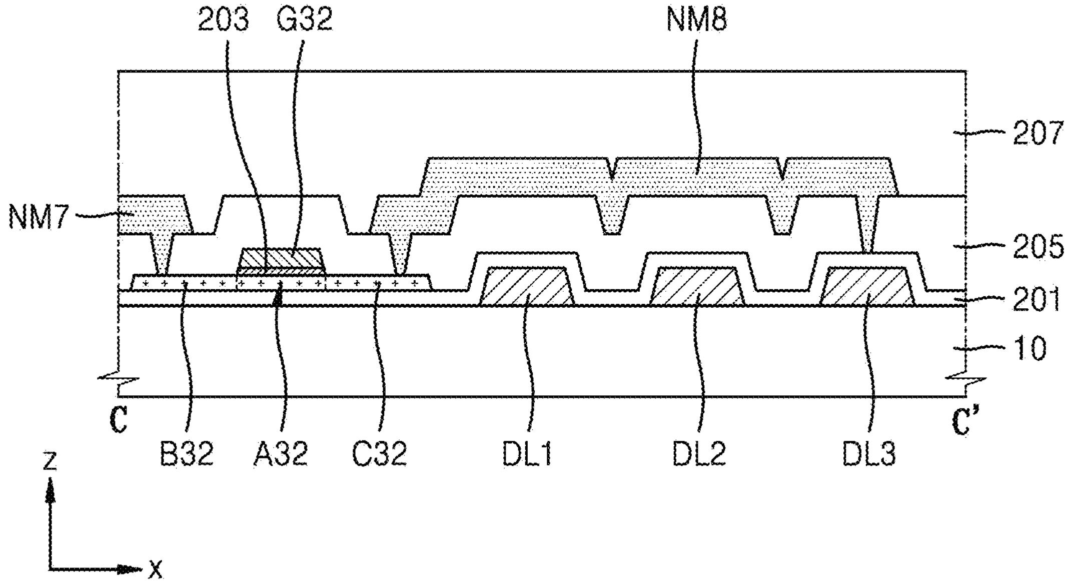
FIG. 17 is a cross-sectional view of another embodiment of a region XVI, taken along line C-C' of FIG. 16.

FIG. 16 is a cross-sectional view of an embodiment of a region XVI of FIG. 14, and FIG. 17 is a cross-sectional view of another embodiment of a region XVI, taken along line C-C' of FIG. 16.

Referring to FIGS. 16 and 17, the third switching semiconductor layer A32 of the third switching transistor M32 may extend in the x-direction and overlap the third switching gate electrode G32 corresponding to a portion of the first branch SL-B.

The third switching semiconductor layer A32 may include a channel region, a first low-resistance region B32, and a second low-resistance region C32, the channel region overlapping the third switching gate electrode G32, and the first and second low-resistance regions B32 and C32 may be respectively disposed on two opposite sides of the channel region. The first low-resistance region B32 may be connected to a seventh connector NM7 through a contact hole of the inter-insulating layer 205, and the seventh connector NM7 may be connected to the first capacitor electrode CE1 of the third storage capacitor Cst3 as shown in FIG. 14. The second low-resistance region C32 may be connected to one side of an eighth connector NM8 through a contact hole of the inter-insulating layer 205. The eighth connector NM8 may be connected to the third data line DL3 through a contact hole of the inter-insulating layer 205 while extending in the x-direction to cross the first and second data lines DL1 and DL2.

The switching semiconductor layer, for example, the third switching semiconductor layer A32 may be apart from the third data line DL3 with the first and second data lines DL1 and DL2 therebetween, and electrically connected to the data line DL3 through the eighth connector NM8. Accordingly, since the third switching semiconductor layer A32 does not cross other data lines, for example, the first and second data lines DL1 and DL2, the occurrence of the cavity 205*v* (refer to FIG. 5) of the inter-insulating layer 205 and damage to the semiconductor layer described above with reference to FIG. 5 may be prevented.

The structure described with reference to FIGS. 16 and 17 is equally applicable to other switching transistors. In an embodiment, a connection structure of the second switching transistor M22 and the second data line DL2 may be substantially the same as the structure described above with reference to FIGS. 16 and 17.

Figure 18:
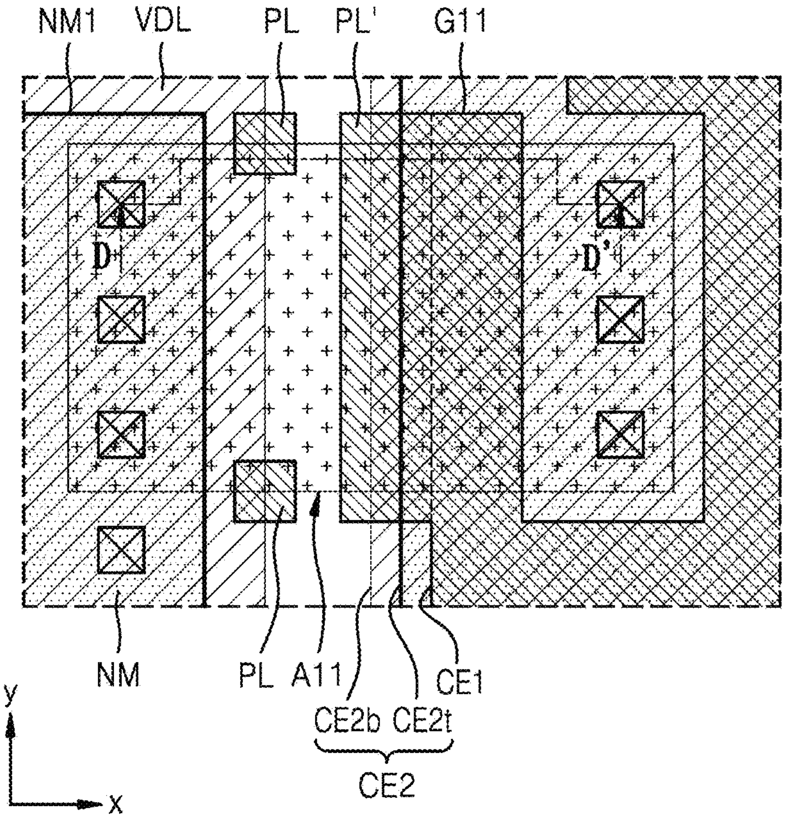
FIG. 18 is a cross-sectional view of another embodiment of a region XVIII of FIG. 14.
Figure 19:
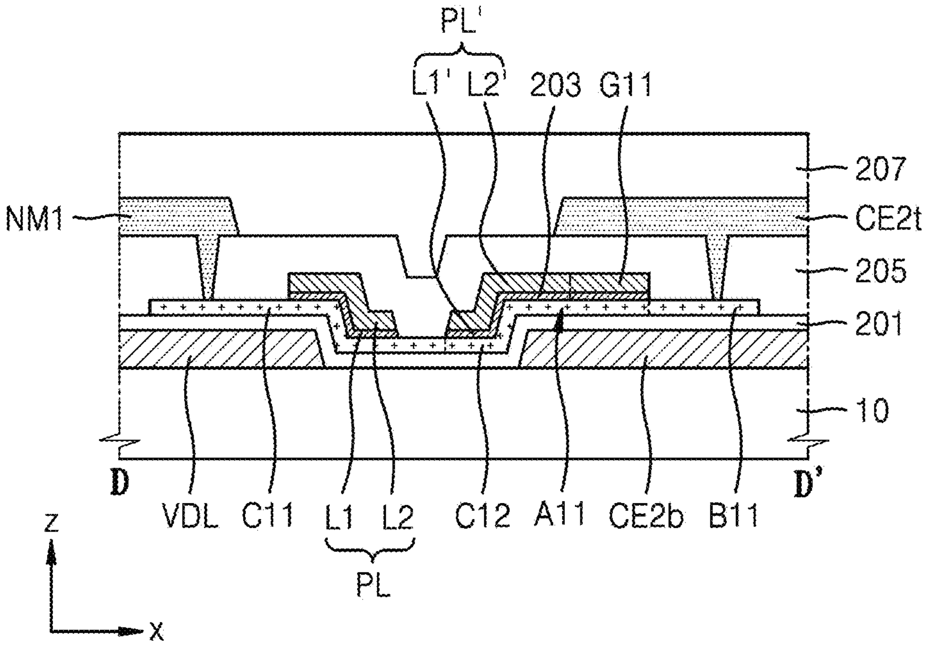
FIG. 19 is a cross-sectional view of another embodiment of the region XVIII, taken along line D-D' of FIG. 18.

FIG. 18 is a cross-sectional view of another embodiment of a region XVIII of FIG. 14 and FIG. 19 is a cross-sectional view of another embodiment of the region XVIII, taken along line D-D' of FIG. 18.

Referring to FIGS. 18 and 19, the first driving semiconductor layer A11 of the first driving transistor M11 may extend in the x-direction and overlap the first driving gate electrode electrically and/or physically (integrally) connected to the first capacitor electrode CE1.

The first driving semiconductor layer A11 may include a channel region, a first low-resistance region B11, and a second low-resistance region C11. The channel region may overlap the first driving gate electrode G11, and the first and second low-resistance regions B11 and C11 may be disposed respectively on two opposite sides of the channel region.

The first low-resistance region B11 may be connected to the second sub-electrode CE2*t* of the first storage capacitor Cst through a contact hole of the inter-insulating layer 205. The second low-resistance region C11 may be connected to the first connector NM1 through a contact hole of the inter-insulating layer 205. The first connector NM1 may be connected to the driving voltage line VDL as shown in FIG. 14.

The driving semiconductor layer, for example, the first driving semiconductor layer A11 may cross a line and/or an electrode arranged thereunder.

The first driving semiconductor layer A11 may cross the driving voltage line VDL, and a crossing region of an edge of the first driving semiconductor layer A11 and an edge of the driving voltage line VDL may overlap or be covered by the first protection layer PL having an isolated shape. As shown in FIG. 19, the protection layer PL may have a stacking structure of the first sub-layer L1 and the second sub-layer L2, the first sub-layer L1 including an insulating material such as an inorganic insulating material, and the second sub-layer L2 having a metal material. In an embodiment, the first sub-layer L1 may include the same material as that of the gate insulating layer 203, and the second sub-layer L2 may include the same material as that of the first driving gate electrode G11.

The first driving semiconductor layer A11 may cross the first sub-electrode CE2*b* of the first storage capacitor Cst1 arranged under the first driving semiconductor layer A11. A crossing region of an edge of the first driving semiconductor layer A11 and an edge of the first sub-electrode CE2*b* may overlap or be covered by the second protection layer PL', the second protection layer PL' may have a stacking structure of the first sub-layer L1' and the second sub-layer L2'. In an embodiment, the first sub-layer L1' may include the same material as that of the gate insulating layer 203 and be unitary with the gate insulating layer 203 under the first driving gate electrode G11 as one body. The second sub-layer L2' may include the same material as that of the first driving gate electrode G11 and be unitary with the first driving gate electrode G11 as one body. In other words, the second sub-layer L2' of the second protection layer PL' may include the first driving gate electrode G11. In an alternative embodiment, the first driving gate electrode G11 may include the second sub-layer L2' of the second protection layer PL'. Since the first and second protection layers PL and PL' overlap or cover the crossing regions, the issue described above with reference to FIG. 5 may be prevented or reduced.

The structure described with reference to FIGS. 18 and 19 is equally applicable to other driving transistors. In an embodiment, a crossing region of an edge of the driving semiconductor layer of the second and third driving transistors M21 and M31 and an edge of the driving voltage line VDL may overlap or be covered by the first protection layer PL. Likewise, a crossing region of an edge of the driving semiconductor layer of the second and third driving transistors M21 and M31 and an edge of the first sub-electrode CE2*b* electrically connected to the corresponding driving semiconductor layer may overlap or be covered by the second protection layer PL'. A predetermined structure thereof is substantially the same as that described in FIGS. 18 and 19.

By embodiments, etchant may be prevented from progressing through a cavity occurring during a process of manufacturing a pixel circuit electrically connected to display elements, and thus, damage to a semiconductor layer of a transistor may be prevented. However, the scope of the invention is not limited by this effect.

It should be understood that embodiments described herein should be considered in a descriptive sense only and not for purposes of limitation. Descriptions of features or advantages within each embodiment should typically be considered as available for other similar features or advantages in other embodiments. While one or more embodiments have been described with reference to the drawing figures, it will be understood by those of ordinary skill in the art that various changes in form and details may be made therein without departing from the spirit and scope of the invention.

What is claimed is:

1. A display device comprising:

a driving voltage line extending in a first direction;

a first data line and a second data line each extending in the first direction;

a first driving transistor electrically connected to the driving voltage line;

a first switching transistor electrically connected to the first driving transistor and the first data line, the first switching transistor including:

a first switching semiconductor layer extending in a second direction crossing the first direction; and a first switching gate electrode overlapping a channel region of the first switching semiconductor layer;

a second driving transistor electrically connected to the driving voltage line; and a second switching transistor electrically connected to the second driving transistor and the second data line, the second switching transistor including:

a second switching semiconductor layer extending in the second direction; and a second switching gate electrode overlapping a channel region of the second switching semiconductor layer;

wherein a portion of the second switching semiconductor layer overlaps a portion of the first data line.

2. The display device of claim 1, wherein:

the first switching semiconductor layer and the second switching semiconductor layer are spaced apart from each other in the first direction.

3. The display device of claim 2, further comprising:

a scan line extending in the second direction, wherein a branch portion of the scan line extends in a direction crossing the second direction and includes the first and second switching gate electrodes.

4. The display device of claim 3, wherein:

the first driving transistor includes a first driving semiconductor layer and the second driving transistor includes a second driving semiconductor layer.

5. The display device of claim 4, wherein, in a plan view, the first and second driving semiconductor layers are disposed between the driving voltage line and the branch portion of the scan line.

6. The display device of claim 5, further comprising:

a first connector overlapping a portion of the driving voltage line and a portion of the first driving semiconductor layer, and electrically connecting the portion of the driving voltage line to the portion of the first driving semiconductor layer.

7. The display device of claim 4, wherein, in a plan view, each of the first and second driving semiconductor layers overlaps the driving voltage line.

8. The display device of claim 3, further comprising:

a first capacitor electrically connected to the first driving transistor and disposed between the driving voltage line and the branch portion of the scan line.

9. The display device of claim 8, further comprising:

a second capacitor electrically connected to the second driving transistor and disposed between the driving voltage line and the branch portion of the scan line, wherein the first and second capacitors are spaced apart from each other in the first direction.

10. The display device of claim 1, further comprising:

a first initialization-sensing transistor electrically connected to the first driving transistor and including a first initialization-sensing semiconductor layer;

a second initialization-sensing transistor electrically connected to the second driving transistor and including a second initialization-sensing semiconductor layer; and a control line extending in the second direction, wherein a branch portion of the control line extends in a direction crossing the second direction, wherein the branch portion of the control line overlaps an other portion the first initialization-sensing semiconductor layer and an other portion of the second initialization-sensing semiconductor layer.

11. The display device of claim 10, wherein the driving voltage line overlaps a portion of the first initialization-sensing semiconductor layer and a portion of the second initialization-sensing semiconductor layer.

12. The display device of claim 1, wherein:

an edge of the portion of the second switching semiconductor layer crosses an edge of the portion of the first data line in a plan view, and an isolated protection layer overlaps an intersection of the edge of the portion of the second switching semiconductor layer and the edge of the portion of the first data line.

13. A display device comprising:

a driving voltage line extending in a first direction;

a plurality of data lines extending in the first direction;

a first driving transistor electrically connected to the driving voltage line, the first driving transistor including:

a first driving semiconductor layer extending in a second direction crossing the first direction; and a first driving gate electrode overlapping a channel region of the first driving semiconductor layer;

a first switching transistor electrically connected to the first driving transistor; and a first storage capacitor electrically connected to the first driving transistor and the first switching transistor, wherein, in a plan view, an edge of the first driving semiconductor layer crosses an edge of at least one selected from the driving voltage line and an electrode of the first storage capacitor, and wherein a protection layer overlaps an intersection of the edge of the first driving semiconductor layer and the edge of at least one.

14. The display device of claim 13, wherein, in a plan view, the edge of the first driving semiconductor layer crosses an edge of the driving voltage line, and the protection layer comprises a first protection layer overlapping a crossing region of the edge of the driving voltage line and the edge of the portion of the first driving semiconductor layer.

15. The display device of claim 14, wherein the first protection layer has an isolated shape in a plan view.

16. The display device of claim 15, wherein the first protection layer comprises a first sub-layer including an insulation material.

17. The display device of claim 16, wherein the first protection layer further comprises a second sub-layer including a metal material.

18. The display device of claim 14, wherein:

in a plan view, the edge of the first driving semiconductor layer crosses an edge of the electrode of the first storage capacitor, and the protection layer comprises a second protection layer overlaps an intersection of the edge of the first driving semiconductor layer and the edge of the electrode of the first storage capacitor.

19. The display device of claim 18, wherein:

the second protection layer comprises a first sub-layer including a same material as a material of a gate insulating layer between the channel region of the first driving semiconductor layer and the first driving gate electrode.

20. The display device of claim 19, wherein:

the second protection layer further comprises a second sub-layer which is unitary with the first driving gate electrode.

21. The display device of claim 13, wherein:

the first switching transistor includes a first switching semiconductor layer electrically connected to a first data line of the plurality of data lines via a connector, wherein the connector extends in the second direction and crosses a second data line arranged between the first data line and the first switching semiconductor layer.

22. The display device of claim 13, wherein the first switching transistor includes a first switching semiconductor layer electrically connected to a first data line of the plurality of data lines, wherein the first switching semiconductor layer crosses a second data line arranged between a channel region of the first switching semiconductor layer and the first data line, and a third protection layer overlaps an intersection of an edge of the first switching semiconductor layer and an edge of the second data line.

* * * * *